(12) United States Patent
Michael et al.

(10) Patent No.: US 10,715,857 B2
(45) Date of Patent: Jul. 14, 2020

(54) RECEPTION APPARATUS, TRANSMISSION APPARATUS, AND DATA PROCESSING METHOD

(71) Applicant: Saturn Licensing LLC, New York, NY (US)

(72) Inventors: Lachlan Bruce Michael, Saitama (JP); Kazuyuki Takahashi, Chiba (JP)

(73) Assignee: Saturn Licensing LLC, New York, NY (US)

( * ) Notice: Subject to any disclaimer, the term of this patent is extended or adjusted under 35 U.S.C. 154(b) by 112 days.

(21) Appl. No.: 15/766,886

(22) PCT Filed: Sep. 30, 2016

(86) PCT No.: PCT/JP2016/078983
§ 371 (c)(1),
(2) Date: Apr. 9, 2018

(87) PCT Pub. No.: WO2017/065020
PCT Pub. Date: Apr. 20, 2017

(65) Prior Publication Data
US 2018/0295407 A1 Oct. 11, 2018

(30) Foreign Application Priority Data
Oct. 15, 2015 (JP) ................... 2015-203773

(51) Int. Cl.
*H04N 21/236* (2011.01)
*H04N 21/61* (2011.01)
(Continued)

(52) U.S. Cl.
CPC ...... *H04N 21/42615* (2013.01); *H04H 20/44* (2013.01); *H04H 60/82* (2013.01);
(Continued)

(58) Field of Classification Search
None
See application file for complete search history.

(56) References Cited

U.S. PATENT DOCUMENTS

2010/0050070 A1 2/2010 Suh et al.
2010/0050217 A1 2/2010 Suh et al.
(Continued)

FOREIGN PATENT DOCUMENTS

| CN | 102325158 A | 1/2012 |
|---|---|---|
| JP | 2013-520036 A | 5/2013 |

(Continued)

OTHER PUBLICATIONS

Extended European Search Report dated Sep. 18, 2018 in corresponding European Patent Application No. 16855274.3, 9 pages.
(Continued)

*Primary Examiner* — Christopher Braniff
(74) *Attorney, Agent, or Firm* — Oblon, McClelland, Maier & Neustadt, L.L.P.

(57) ABSTRACT

The present disclosure describes a reception apparatus that includes demodulation circuitry configured to obtain packets included in a plurality of PLPs (Physical Layer Pipes) of a broadcast stream, and processing circuitry configured to process the packets obtained by the demodulation circuitry. The demodulation circuitry and the processing circuitry are interconnected via a single interface. Each combination of an IP (Internet Protocol) address and a port number of an IP packet or a UDP (User Datagram Protocol) packet included in the plurality of PLPs is unique for each PLP in which the corresponding IP packet or the corresponding UDP packet is included. The processing circuitry is configured to identify a PLP in which one of the packets input via the single interface from the demodulation circuitry is included
(Continued)

according to the combination of the IP address and the port number of the one of the packets.

13 Claims, 35 Drawing Sheets

(51) Int. Cl.
    *H04N 21/426*    (2011.01)
    *H04H 60/82*     (2008.01)
    *H04N 21/235*    (2011.01)
    *H04H 20/44*     (2008.01)
    *H04N 21/643*    (2011.01)
    *H04N 21/845*    (2011.01)

(52) U.S. Cl.
    CPC ......... *H04N 21/235* (2013.01); *H04N 21/236* (2013.01); *H04N 21/426* (2013.01); *H04N 21/23608* (2013.01); *H04N 21/6175* (2013.01); *H04N 21/64322* (2013.01); *H04N 21/8456* (2013.01)

(56) References Cited

U.S. PATENT DOCUMENTS

| | | | | |
|---|---|---|---|---|
| 2010/0323682 | A1* | 12/2010 | Hatayama | H04H 20/08 455/422.1 |
| 2012/0327955 | A1* | 12/2012 | Herrmann | H04N 21/235 370/476 |
| 2013/0167172 | A1 | 6/2013 | Suh et al. | |
| 2013/0219431 | A1 | 8/2013 | Hong et al. | |
| 2013/0268631 | A1 | 10/2013 | Suh et al. | |
| 2013/0308505 | A1 | 11/2013 | Hong et al. | |
| 2014/0123174 | A1 | 5/2014 | Suh et al. | |
| 2014/0195879 | A1 | 7/2014 | Hong et al. | |
| 2014/0229804 | A1 | 8/2014 | Hong et al. | |
| 2014/0250209 | A1 | 9/2014 | Suh et al. | |
| 2014/0250478 | A1 | 9/2014 | Suh et al. | |
| 2015/0208104 | A1 | 7/2015 | Suh et al. | |
| 2015/0271535 | A1 | 9/2015 | Suh et al. | |
| 2016/0073152 | A1 | 3/2016 | Suh et al. | |
| 2016/0219133 | A1* | 7/2016 | Kwon | H04L 65/4076 |
| 2016/0360241 | A1 | 12/2016 | Hong et al. | |
| 2017/0245020 | A1 | 8/2017 | Suh et al. | |
| 2017/0280172 | A1 | 9/2017 | Hong et al. | |

FOREIGN PATENT DOCUMENTS

| | | |
|---|---|---|
| WO | WO 2008/047475 A1 | 4/2008 |
| WO | WO 2010/067983 A2 | 6/2010 |

OTHER PUBLICATIONS

International Search Report dated Dec. 20, 2016 in PCT/JP2016/078983.

"Digital Video Broadcasting (DVB); Frame structure channel coding and modulation for a second generation digital terrestrial television broadcasting system (DVB-T2)", ETSI EN 302 755, V1.3.1, Nov. 2011, 189 pages.

\* cited by examiner

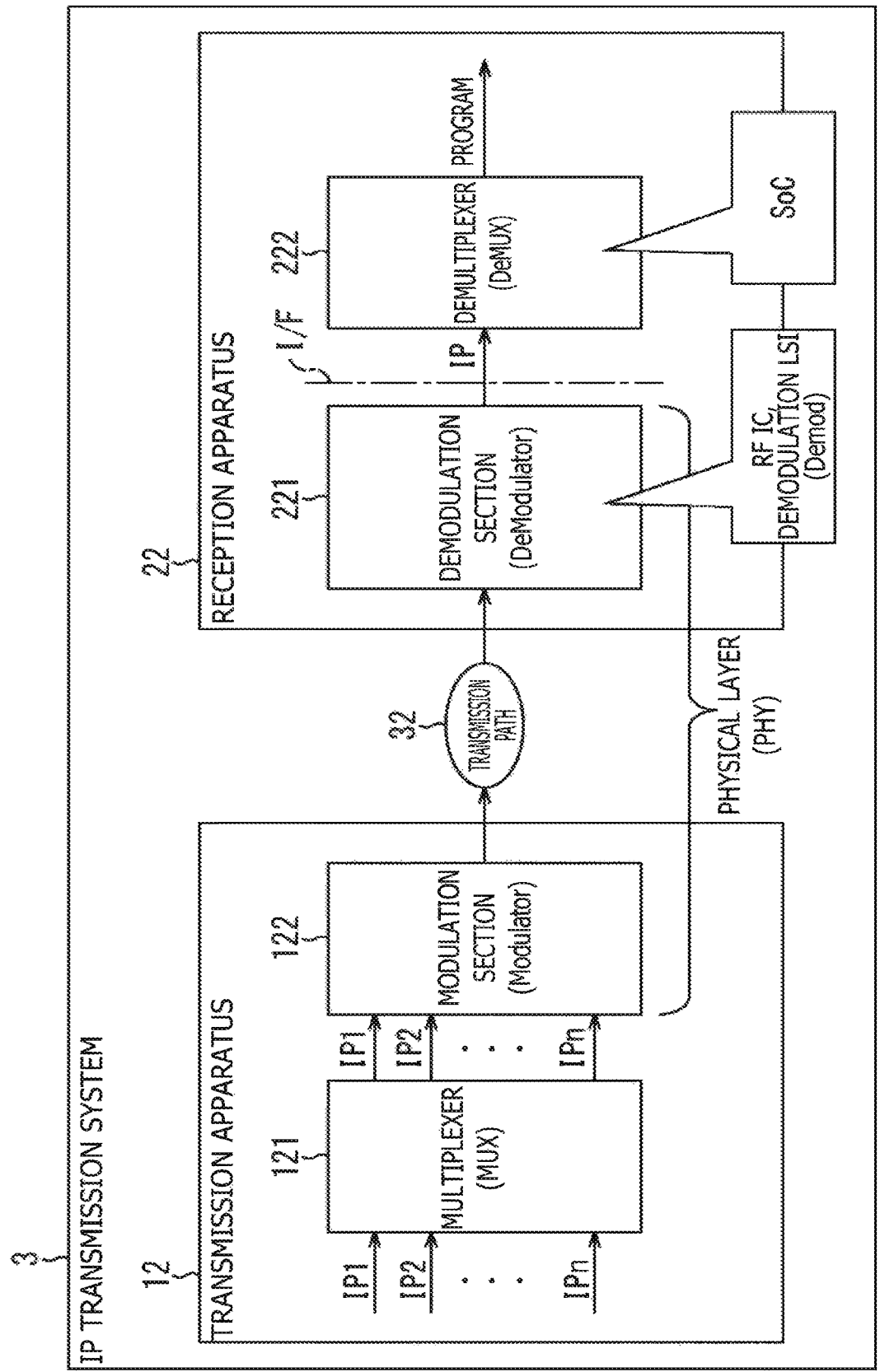

FIG. 9

| | METHOD | | PROCESSING DETAIL |
|---|---|---|---|
| 1 | 1-1 | TRANSMITTING-SIDE IP DATA FLOW IDENTIFICATION METHOD | IP DATA FLOW ID IS MADE UNIQUE. METHOD ALLOWS TRANSMITTING SIDE TO CONFIGURE IP SYSTEM FOR IDENTIFYING IP DATA FLOW. |
| | 1-2 | RECEIVING-SIDE IP DATA FLOW IDENTIFICATION METHOD | IP DATA FLOW ID IS MADE UNIQUE. METHOD ALLOWS RECEIVING SIDE TO REALLOCATE VALUES IDENTIFYING IP DATA FLOW. |
| 2 | 2-1 | TRANSMITTING-SIDE INFORMATION ADDITION METHOD | PLP INFORMATION IS ADDED. METHOD ALLOWS TRANSMITTING SIDE TO INCLUDE PLP INFORMATION INTO DATA. |
| | 2-2 | RECEIVING-SIDE INFORMATION ADDITION METHOD 1 | PLP INFORMATION IS ADDED. METHOD ALLOWS RECEIVING SIDE TO ADD PLP INFORMATION INSIDE IP PACKET, ALP PACKET, OR BBP. |
| | 2-3 | RECEIVING-SIDE INFORMATION ADDITION METHOD 2 | PLP INFORMATION IS ADDED. METHOD ALLOWS RECEIVING SIDE TO ADD PLP INFORMATION OUTSIDE IP PACKET, ALP PACKET, OR BBP. |

F I G. 13

2-1 TRANSMITTING-SIDE INFORMATION ADDITION METHOD

| Syntax | No of Bits | Mnemonic | Semantics |
|---|---|---|---|
| PLP_info(){ | | | |
| PLP_id | 6 | uimsbf | PLP id |
| reserved | 2 | bslbf | |
| } | | | |

FIG. 20

A DESCRIPTOR TRANSMISSION METHOD

| Syntax | No of Bits | Mnemonic | Semantics |
|---|---|---|---|
| PLP_info() { | | | |
| PLP_info_id | 8 | uimsbf | ID FOR INDICATING DESCRIPTOR TYPE |
| PLP_id | 6 | uimsbf | PLP id |
| reserved | 2 | bslbf | |
| } | | | |

FIG. 24

| LLS Index | Object Version | PLP_info |
|---|---|---|

- LLS Index: index value for delivery object of compression scheme, type, type extension for each fragment type
- Object Version: version of fragment object

FIG. 25

D L2 SIGNALING TRANSMISSION METHOD

| Syntax | No of Bits | Mnemonic | Semantics |
|---|---|---|---|
| PLP_info() { | | | |
|   PLP_info_id | 8 | uimsbf | ID FOR INDICATING DESCRIPTOR TYPE |
|   PLP_id | 6 | uimsbf | PLP id |
|   reserved | 2 | bslbf | |
| } | | | |

RECEPTION APPARATUS, TRANSMISSION APPARATUS, AND DATA PROCESSING METHOD

TECHNICAL FIELD

The present technology relates to a reception apparatus, a transmission apparatus, and a data processing method. More particularly, the technology relates to a reception apparatus, a transmission apparatus, and a data processing method for allowing the receiving side to configure circuits at lower costs.

BACKGROUND ART

For example, the ATSC (Advanced Television System Committee) standard 3.0, one of the next-generation terrestrial broadcasting standards, has determined the adoption of the IP/UDP (Internet Protocol/User Datagram Protocol), i.e., the method by which IP (Internet Protocol) packets including UDP (User Datagram Protocol) packets are mainly used instead of TS (Transport Stream) packets for data transmission (the method will be referred to as the IP transmission method hereunder). Furthermore, broadcasting standards other than ATSC 3.0 will hopefully also adopt the IP transmission method in the future.

Furthermore, according to the M-PLP (Multiple PLP) method stipulated by the DVB-T2 (Digital Video Broadcasting-Second Generation Terrestrial) standard, a single interface is implemented by the receiving side between upstream circuits that perform the process of restoring a transport stream (TS) on the one hand and downstream circuits that carry out processes such as a decoding process on the other hand (e.g., see NPL 1).

CITATION LIST

Non Patent Literature

[NPL 1]
ETSI EN 302 755 V1.3.1 (2011-11)

SUMMARY

Technical Problem

Incidentally, even where the IP transmission method is adopted, it is preferred that a single interface be provided on the receiving side between a demodulation device (demodulation LSI) and a downstream system-on-chip (SoC) in terms of costs, as in the case of DVB-T2. Proposals have thus been solicited for configuring receiving-side circuits at lower costs using a single interface to provide connections between circuits (chips) on the receiving side, such as between the demodulation device (demodulation LSI) and the system-on-chip (SoC).

The present technology has been devised in view of the above circumstances. An object of the technology is therefore to configure receiving-side circuits at lower costs.

Solution to Problem

According to a first aspect of the present technology, there is provided a reception apparatus including: a demodulation section configured to demodulate a packet included in each of multiple PLPs (Physical Layer Pipes) of a broadcast stream; and a processing section configured to process the packet demodulated by the demodulation section. The demodulation section and the processing section are interconnected via a single interface. The processing section identifies the PLP to which the packet input via the single interface from the demodulation section belongs on the basis of information for identifying the PLP to which the packet belongs.

The reception apparatus according to the first aspect of the present technology may be an independent apparatus or an internal block as part of an apparatus. Furthermore, a data processing method according to the first aspect of the present technology corresponds to the above-mentioned reception apparatus according to the first aspect thereof.

Where the reception apparatus or the data processing method according to the first aspect of the present technology is in use, the demodulation section demodulating a packet included in each of multiple PLPs (Physical Layer Pipes) of the broadcast stream is connected with the processing section processing the packet demodulated by the demodulation section via the single interface. The processing section identifies the PLP to which the packet input via the single interface from the demodulation section belongs on the basis of information for identifying the PLP to which the packet belongs.

According to a second aspect of the present technology, there is provided a transmission apparatus including: a processing section configured to process a packet included in each of multiple PLPs of a broadcast stream; and a modulation section configured to modulate the packet to be processed by the processing section. The broadcast stream includes information for identifying the PLP to which the packet belongs.

The transmission apparatus according to the second aspect of the present technology may be an independent apparatus or an internal block as part of an apparatus. Furthermore, a data processing method according to the second aspect of the present technology corresponds to the above-mentioned transmission apparatus according to the second aspect thereof.

Where the transmission apparatus or the data processing method according to the second aspect of the present technology is in use, a packet included in each of multiple PLPs of the broadcast stream is processed. The packet to be processed by the processing section is modulated. The broadcast stream includes information for identifying the PLP to which the packet belongs.

Advantageous Effect of Invention

Thus, according to the first and the second aspects of the present technology, it is possible to configure receiving-side circuits at lower costs.

Note that the advantageous effect outlined above are not limitative of the present disclosure. Further advantages of the disclosure will become apparent from the ensuing description.

BRIEF DESCRIPTION OF DRAWINGS

FIG. 8 is a schematic diagram depicting a typical configuration of an IP transmission system to which the present technology is applied.

FIG. 9 is a tabular diagram depicting typical methods for implementing a single interface (I/F) for receiving-side circuits.

FIG. 13 is a tabular diagram depicting typical syntax for PLP information to be added to data where a transmitting-side information addition method is adopted.

FIG. 20 is an explanatory diagram explaining a descriptor transmission method.

FIG. 24 is another explanatory diagram explaining the L2 signaling header transmission method.

FIG. 25 is an explanatory diagram explaining an L2 signaling transmission method.

DESCRIPTION OF EMBODIMENTS

Figure 1:
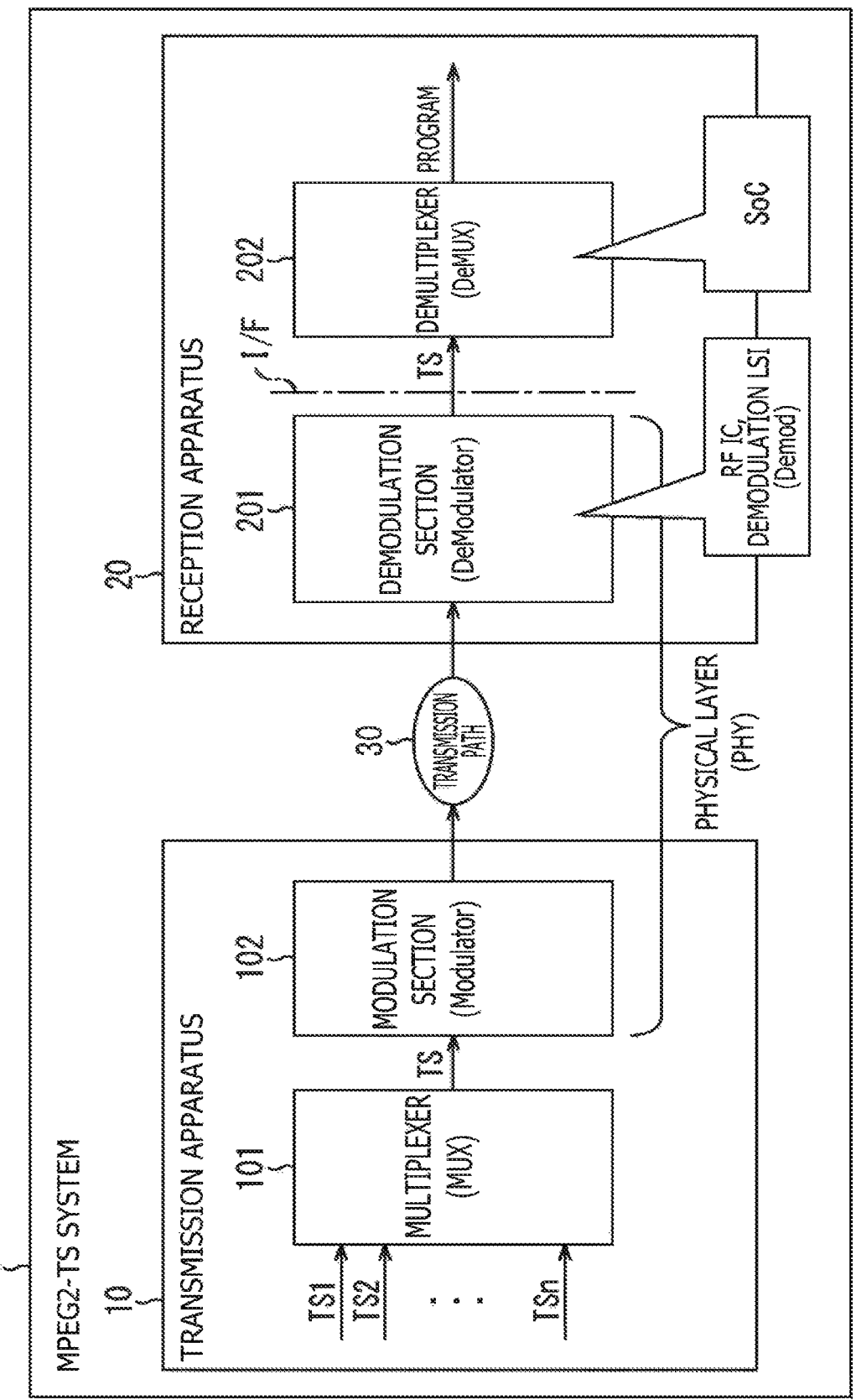
FIG. 1 is a schematic diagram depicting a typical configuration of an MPEG2-TS system.

Some preferred embodiments of the present technology are described below with reference to the accompanying drawings. Note that the description will be given under the following headings.
1. Overview of interface for circuits on receiving side
2. Methods for implementing single interface for circuits on receiving side
(1) IP data flow identification methods
(2) Information addition methods
3. PLP information transmission methods
4. Measures by other methods
(1) MMT method
(2) MPEG2-TS method
5. Flows of processing performed by apparatuses
6. Variations
7. Configuration of computer <1. Overview of Interface for Circuits on Receiving Side>
(MPEG2-TS System)

FIG. 1 is a schematic diagram depicting a typical configuration of an MPEG2-TS (Transport Stream) system that adopts the MPEG2-TS method. Note that the system here is understood to be a logical aggregate of multiple apparatuses.

In FIG. 1, an MPEG2-TS system 1 includes a transmission apparatus 10 and a reception apparatus 20.

The transmission apparatus 10 is a transmitter that supports the MPEG2-TS method and transmits via a transmission path 30 a broadcast stream including content such as broadcast programs. The reception apparatus 20 is a receiver that supports the MPEG2-TS method and receives a broadcast stream via the transmission path 30 from transmission apparatus 10 to reproduce therefrom content such as broadcast programs.

The transmission apparatus 10 includes a multiplexer 101 and a modulation section 102.

Multiple transport streams (TS) are input to the multiplexer 101. Each transport stream (TS) includes video and audio components as well as signaling corresponding to content such as broadcast programs.

The multiplexer 101 multiplexes multiple input transport streams (TS1 to TSn) into a transport stream (TS) that is supplied to the modulation section 102.

The modulation section 102 performs processes related to the physical layer (PHY) such as an error correction encoding process and a modulation process on the transport stream (TS) supplied from the multiplexer 101. The modulation section 102 obtains a signal from the processing and transmits the signal as a digital broadcast signal via an antenna.

The digital broadcast signal transmitted from the transmission apparatus 10 is received by the reception apparatus 20 via the transmission path 30 for terrestrial broadcasts, for example.

The reception apparatus 20 includes a demodulation section 201 and a demultiplexer 202.

The demodulation section 201 is typically formed by an RF IC (Integrated Circuit) or demodulation LSI (Large Scale Integration) that performs processes related to the physical layer (PHY). The demodulation section 201 carries out such processes as a demodulation process and an error correction decoding process on the input signal. The demodulation section 201 obtains a transport stream (TS) from the processing and supplies the transport stream (TS) to the demultiplexer 202.

The demultiplexer 202 is configured as a system-on-chip (SoC), for example. The demultiplexer 202 demultiplexes the transport stream (TS) supplied from the demodulation section 201 and outputs a transport stream (e.g., TS2) corresponding to a selected broadcast program to downstream circuits.

Note that the downstream circuits perform processes such as that of decoding the video and audio data included in the transport stream (e.g., TS2) so as to reproduce the selected broadcast program (content).

In the reception apparatus 20, the demodulation section 201 configured as an RF IC or demodulation LSI and the demultiplexer 202 configured as a system-on-chip (SoC) are provided as two different chips that are interconnected via a single interface (I/F). That is, the reception apparatus 20 supporting the MPEG2-TS method adopted extensively today uses a single interface (I/F) to input the transport stream (TS) from the demodulation section 201 to the demultiplexer 202.

(M-PLP Method According to DVB-T2 Standard)

Figure 2:
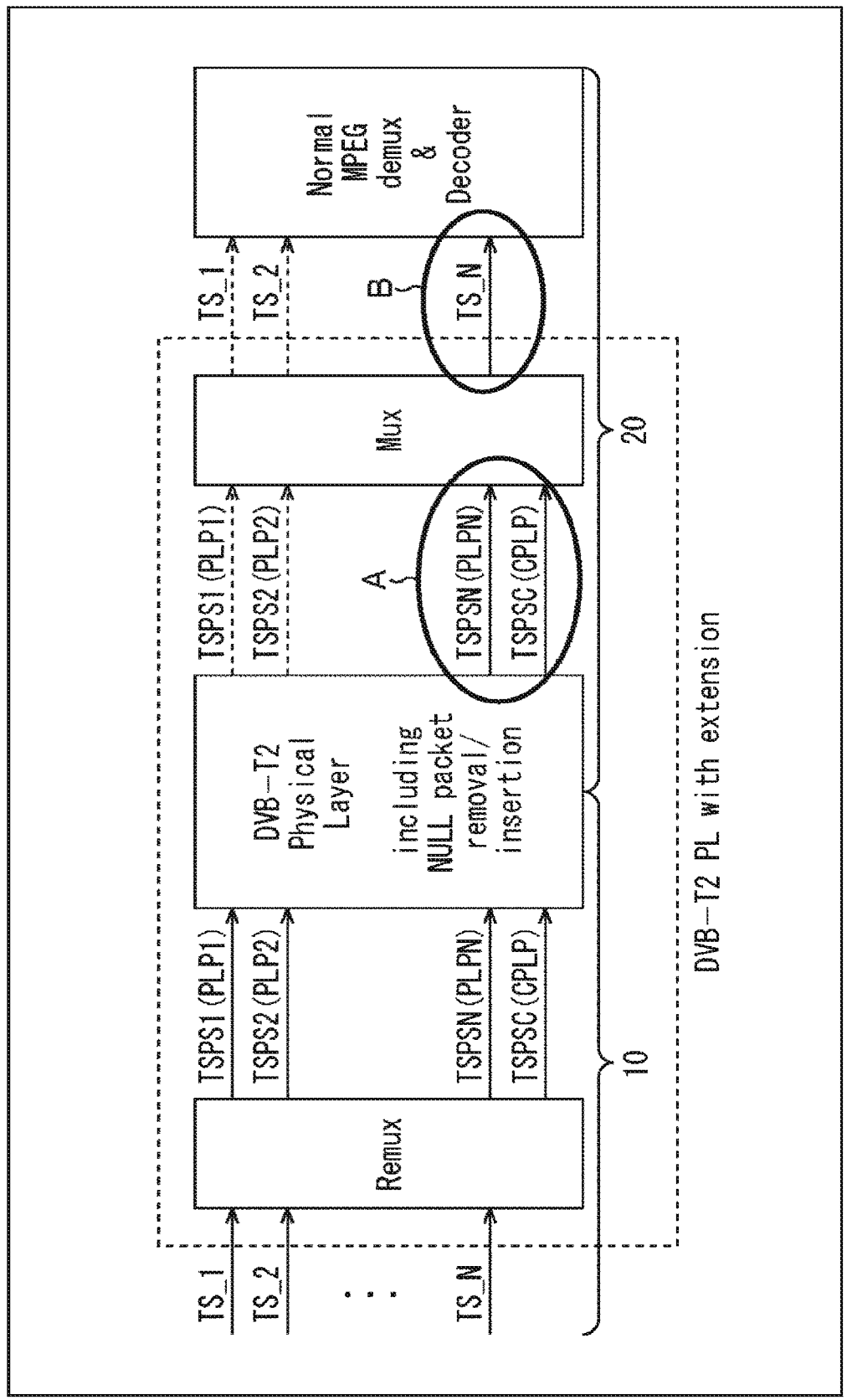
FIG. 2 is an explanatory diagram explaining the M-PLP method stipulated by DVB-T2.

FIG. 2 is an explanatory diagram explaining the M-PLP (Multiple PLP) method stipulated by the DVB-T2 standard.

The DVB-T2 standard supports up to 256 PLPs according to the M-PLP method. It is the transmission apparatus 10 on the transmitting side, it is to be noted, that supports up to 256 PLPs. It is stipulated that the reception apparatus 20 on the receiving side need not support 256 PLPs simultaneously and that at least two PLPs need only be received at the same time.

Of the two PLPs, one PLP is a Common PLP and the other is a Data PLP. The Common PLP is a packet sequence generated using common packets extracted from packets included in multiple transport streams (TS). Furthermore, the Data PLP is a packet sequence including the packets included in the transport streams (TS) minus the common packets.

Suppose that in FIG. 2, multiple transport streams (TS_1 to TS_N) are input to the transmission apparatus 10 on the transmitting side depicted on the left. In this case, a remultiplexer (Remux) extracts common packets from the packets included in these transport streams to generate a Common PLP packet sequence (TSPSC (CPLP)). Furthermore, the remultiplexer (Remux) also generates a Data PLP packet sequence (TSPS1 (PLP1) to TSPSN (PLPN)) minus the common packets.

That is, the transmission apparatus 10 on the transmitting side generates N Data PLPs and one Common PLP from N transport streams (TS). A broadcast stream including these PLPs is transmitted from the transmission apparatus 10 on the transmitting side to the reception apparatus 20 on the receiving side via the transmission path 30.

In FIG. 2, the reception apparatus 20 on the receiving side depicted on the right in the figure demodulates and extracts only desired PLPs from the multiple Data PLPs (TSPS1 (PLP1) to TSPSN (PLPN)) and from the Common PLPs (TSPSC (CPLP)). The extracted PLPs are processed by a multiplexer (Mux) to reconstruct a desired transport stream (TS).

For example, as indicated in frames A and B in FIG. 2, if TSPSN (PLPN) is selected from TSPS1 (PLP1) through TSPSN (PLPN), then a transport stream (TS_N) is reconstructed using TSPSN (PLPN) as a Data PLP and TSPSC (CPLP) as a Common PLP.

The reception apparatus 20 on the receiving side outputs the reconstructed transport stream (TS_N) to a downstream processing section (Normal MPEG demux & Decoder). The downstream processing section performs processes such as that of decoding the video and audio data included in the transport stream (TS_N). This allows the reception apparatus 20 on the receiving side to reproduce the selected broadcast program (content).

As described above, where the M-PLP method stipulated by the DVB-T2 standard is used, the transmission apparatus 10 on the transmitting side generates N Data PLPs and one Common PLP from N transport streams (TS) and transmits what is generated. On the receiving side, the reception apparatus 20 reconstructs (regenerates) the desired transport stream (TS) from the desired Data PLPs and one Common PLP.

In the reception apparatus 20, the multiplexer (Mux) and the downstream processing section (Normal MPEG demux & Decoder) are configured as different chips that are interconnected via a single interface. The single interface (I/F) allows the (selectively reconstructed) transport stream (TS_N) from the multiplexer (Mux) to be input to the downstream processing section.

That is, even where the M-PLP method stipulated by the DVB-T2 standard is adopted, the circuits (chips) making up the receiving side are interconnected by a single interface (I/F) as in a case where the MPEG2-TS method (FIG. 1) extensively used today is adopted. In other words, with the M-PLP method according to the DVB-T2 standard adopted, the same configuration of the receiving-side reception apparatus 20 as that with the MPEG2-TS method adopted is maintained.

(IP Transmission System)

Figure 3:
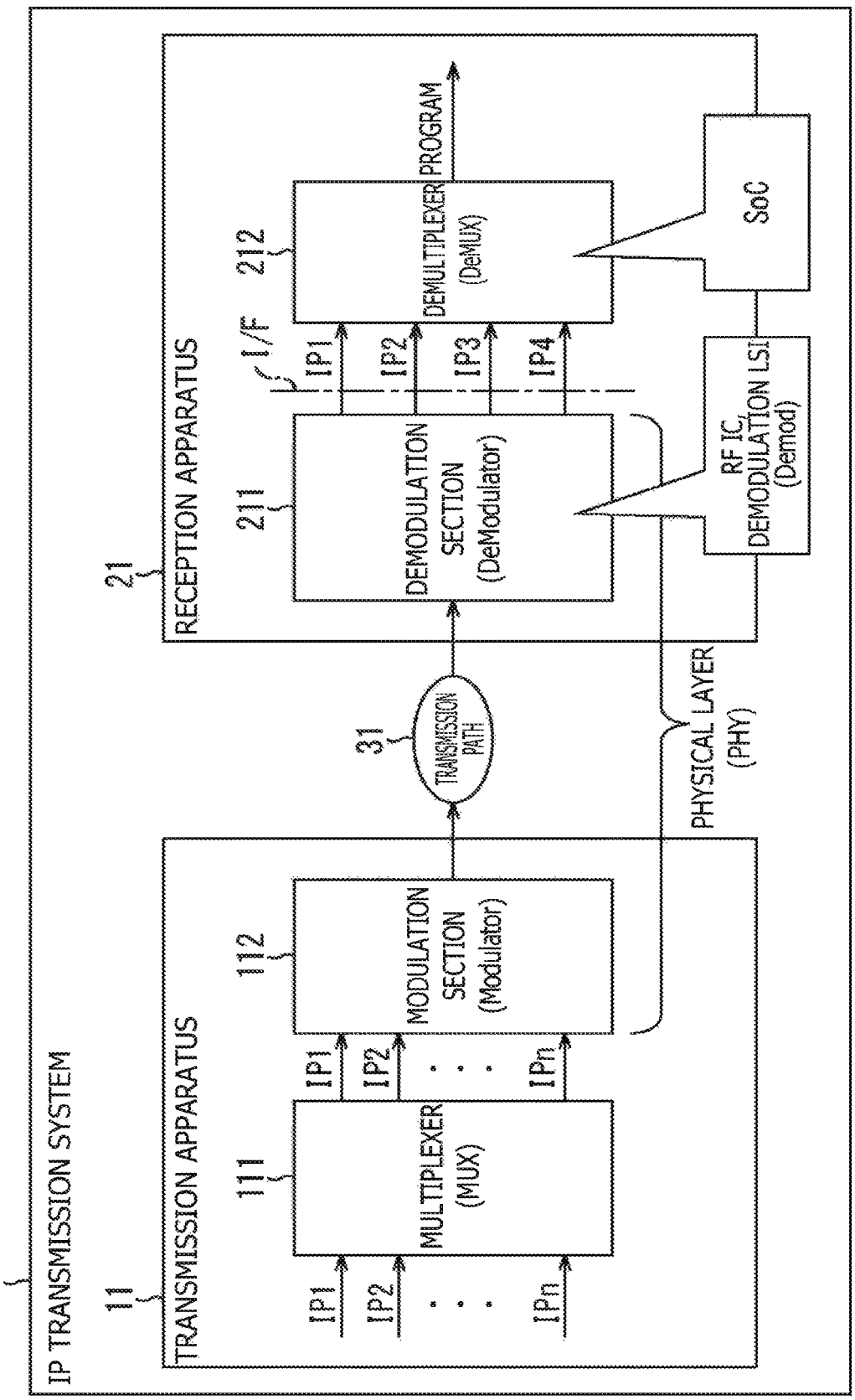
FIG. 3 is a schematic diagram depicting a typical configuration of an IP transmission system.

FIG. 3 is a schematic diagram depicting a typical configuration of an IP transmission system that adopts the IP transmission method.

In FIG. 3, an IP transmission system 2 includes a transmission apparatus 11 and a reception apparatus 21.

The transmission apparatus 11 is a transmitter that supports the IP transmission method and transmits a broadcast stream including content such as broadcast programs via a transmission path 31. The reception apparatus 21 is a receiver that supports the IP transmission method and receives a broadcast stream transmitted from the transmission apparatus 11 via the transmission path 31 to reproduce content such as broadcast programs.

For example, the ATSC 3.0 standard currently worked out adopts the IP transmission method. The transmission apparatus 11 on the transmitting side supports up to 64 PLPs on a given frequency band using this method. On the other hand, the reception apparatus 21 on the receiving side needs to receive up to four PLPs simultaneously. That is, the reception apparatus 21 on the receiving side is caused to receive multiple PLPs simultaneously so that the modulation method and encoding method (encoding rate) of each PLP may be changed to provide the audio of higher robustness and the video of higher quality, for example.

The transmission apparatus 11 includes a multiplexer 111 and a modulation section 112.

Multiple IP streams are input to the multiplexer 111. The IP streams support an IP packet including a UDP packet (called the IP packet hereunder). According to the ATSC 3.0 standard, for example, up to 64 IP streams are input on a given frequency band corresponding to the PLPs. Furthermore, each IP stream (IP) includes video and audio components as well as signaling corresponding to content such as broadcast programs.

The multiplexer 111 processes the input multiple IP streams (IP1 to IPn) and supplies what is processed to the modulation section 112.

The modulation section 112 performs processes related to the physical layer (PHY) such as an error correction encoding process (e.g., BCH encoding or LDPC encoding) and a modulation process (e.g., OFDM (Orthogonal Frequency Division Multiplexing)) on multiple IP streams (IP1 to IPn) supplied from the multiplexer 111. The modulation section 112 obtains a signal from the processing and transmits the signal as a digital broadcast signal via an antenna.

The digital broadcast signal transmitted from the transmission apparatus 11 is received by the reception apparatus 21 via the transmission path 31 for terrestrial broadcasts, for example.

The reception apparatus 21 includes a demodulation section 211 and a demultiplexer 212.

The demodulation section 211 is typically configured as an RF IC or demodulation LSI that performs processes related to the physical layer (PHY). The demodulation section 211 carries out such processes as a demodulation process (e.g., OFDM demodulation) and an error correction decoding process (e.g., LDPC decoding or BCH decoding) on the input signal. The demodulation section 211 obtains four IP streams (IP1 to IP4) from the processing and supplies the IP streams to the demultiplexer 212.

The demultiplexer 212 is typically configured as a system-on-chip (SoC). The demultiplexer 212 processes the four IP streams (IP1 to IP4) supplied from the demodulation section 211, and outputs the IP stream corresponding to the selected broadcast program to downstream circuits.

Note that the downstream circuits perform processes such as that of decoding the video and audio data included in the IP stream so as to reproduce the selected broadcast program (content).

In the reception apparatus 21, the demodulation section 211 configured as an RF IC or demodulation LSI and the demultiplexer 212 configured as a system-on-chip (SoC) are provided as two different chips. Because four IP streams (IP1 to IP4) from the demodulation section 211 are input to the demultiplexer 212, four interfaces (I/F) are needed to address the four IP streams.

(System pipe model)

Figure 4:
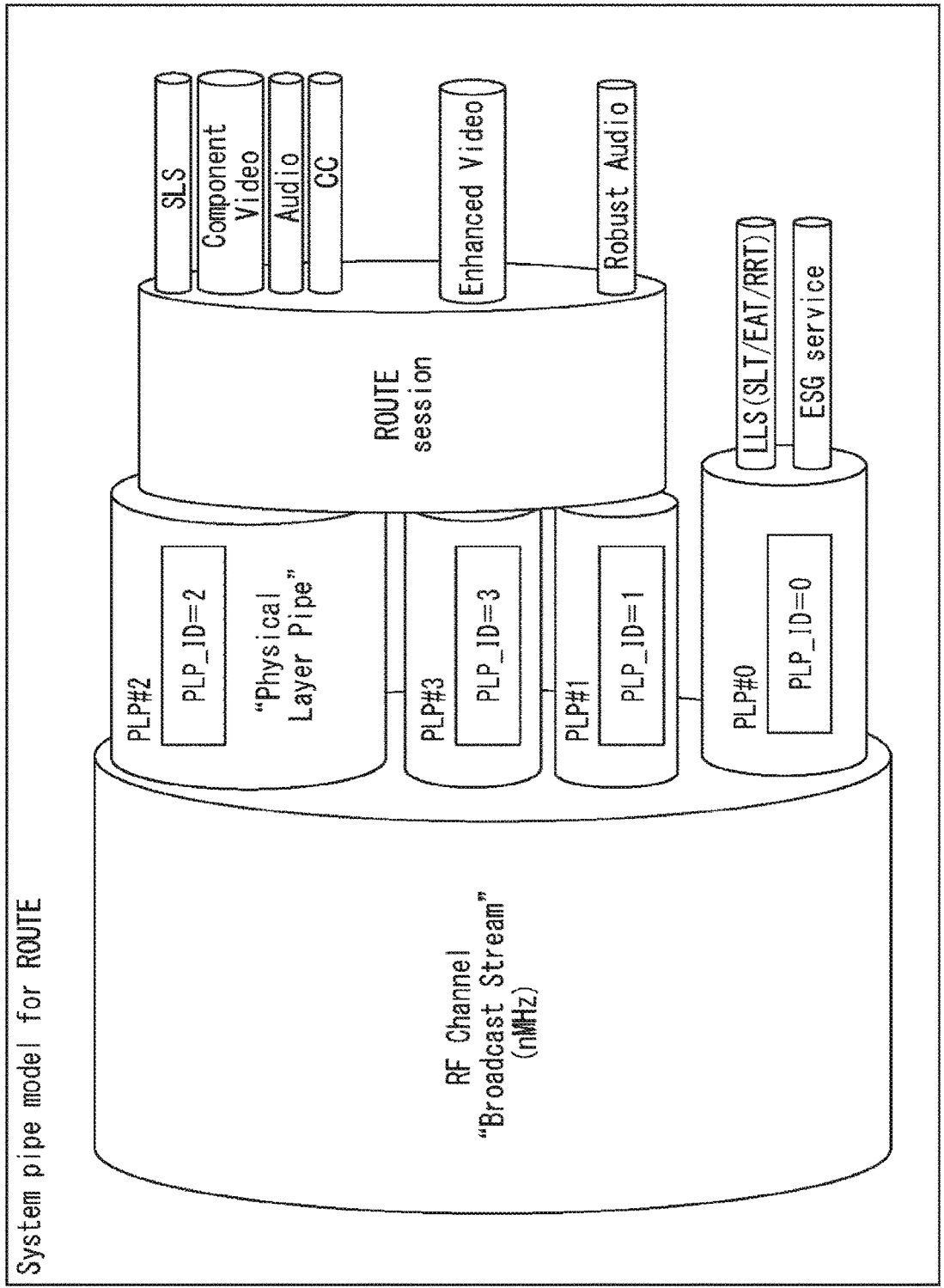
FIG. 4 is a schematic diagram depicting a typical system pipe model of a ROUTE method.

FIG. 4 is a schematic diagram depicting a typical system pipe model of a ROUTE method.

For example, the ATSC 3.0 standard currently worked out is presumed to adopt the ROUTE (Real-Time Object Delivery over Unidirectional Transport) as the transport protocol.

The ROUTE is a protocol as an extension of the FLUTE (File Delivery over Unidirectional Transport) suitable for unidirectional multicast delivery of binary files. A ROUTE session may be used to transmit video and audio components as well as signaling.

FIG. 4 depicts that a broadcast stream on a given frequency band (e.g., 6 MHz) includes a PLP with PLP ID "0" (also described as PLP #0 hereunder), a PLP with PLP ID "1" (also described as PLP #1), a PLP with PLP ID "2" (also described as PLP #2), and a PLP with PLP ID "3" (also described as PLP #3).

PLP #0 includes LLS signaling and an ESG stream. It is to be noted that the LLS signaling and the ESG stream are placed in IP packets and transmitted.

The ATSC 3.0 standard is presumed to use LLS (Link Layer Signaling) and SLS (Service Layer Signaling) as the signaling. The LLS signaling is acquired prior to the SLS signaling. The SLS signaling is acquired in accordance with information included in the LLS signaling.

The LLS signaling includes metadata such as an SLT (Service List Table), an EAT (Emergency Alerting Table), and an RRT (Region Rating Table).

The SLT metadata includes information indicating the configuration of streams and services on a broadcasting network, such as information necessary for service selection (tuning information). The EAT metadata includes information related to emergency information that needs to be announced urgently. The RRT metadata includes rating-related information. Furthermore, an ESG (Electronic Service Guide) as metadata is self-explanatory (i.e., electronic program guide).

PLP #1 includes a robust audio stream. It is to be noted that the robust audio stream is placed in IP packets and transmitted in a ROUTE session. The robust audio is highly robust audio data transmitted in a stream with higher robustness than ordinary streams.

PLP #2 includes video (base video) and audio components, a caption component, and an SLS signaling stream. It is to be noted that the video and other components and the SLS signaling stream are placed in IP packets and transmitted in the ROUTE session. The video and audio components and the caption component are decoded so as to reproduce content such as broadcast programs.

Furthermore, the SLS signaling includes metadata associated with individual services, such as USBD (User Service Bundle Description) or USD (User Service Description), S-TSID (Service-based Transport Session Instance Description), and MPD (Media Presentation Description).

The USBD or USD metadata includes information associated with the sources from which to acquire other metadata, for example. The S-TSID metadata is a variation of the LSID (LCT Session Instance Description) extended to comply with the ATSC 3.0 standard. As such, the S-TSID metadata constitutes ROUTE protocol control information. The MPD metadata is control information for managing the reproduction of the component streams.

Note that the metadata such as USBD, USD, S-TSID, and MPD are described in markup language such as XML (Extensible Markup Language). Furthermore, the MPD metadata complies with specifications of the MPEG-DASH (Dynamic Adaptive Streaming over HTTP).

PLP #3 includes an enhanced video stream. It is to be noted that the enhanced video stream is placed in IP packets and transmitted in the ROUTE session. The enhanced video is additional information for enhancing the base video stream (e.g., information for improving resolution, frame rate, or image quality).

For example, when a low-quality video stream (such as video (base video) stream in PLP #2) is transmitted (delivered), additional information for enhancing the video stream as the base layer may be transmitted (delivered) as an enhancement layer at the same time (enhanced video stream in PLP #3). This allows the reception apparatus 21 to reproduce not only normal-quality video (e.g., 2K resolution video) corresponding to the base layer but also high-quality video (e.g., 4K resolution video) obtained by combining the base layer with the enhancement layer.

With broadcast streams according to the IP transmission method, as described above, multiple PLPs are used to transmit not only the video and audio streams along with the signaling stream but also robust audio and enhanced video streams. This makes it possible to output the highly robust audio in PLP #1 instead of the normal audio in PLP #2 or to reproduce the high-quality video obtained by combining the base layer of PLP #2 with the enhancement layer of PLP #3 in place of the normal-quality video of PLP #2.
(Relations Between Multiple PLPs and ROUTE Session)

Figure 5:
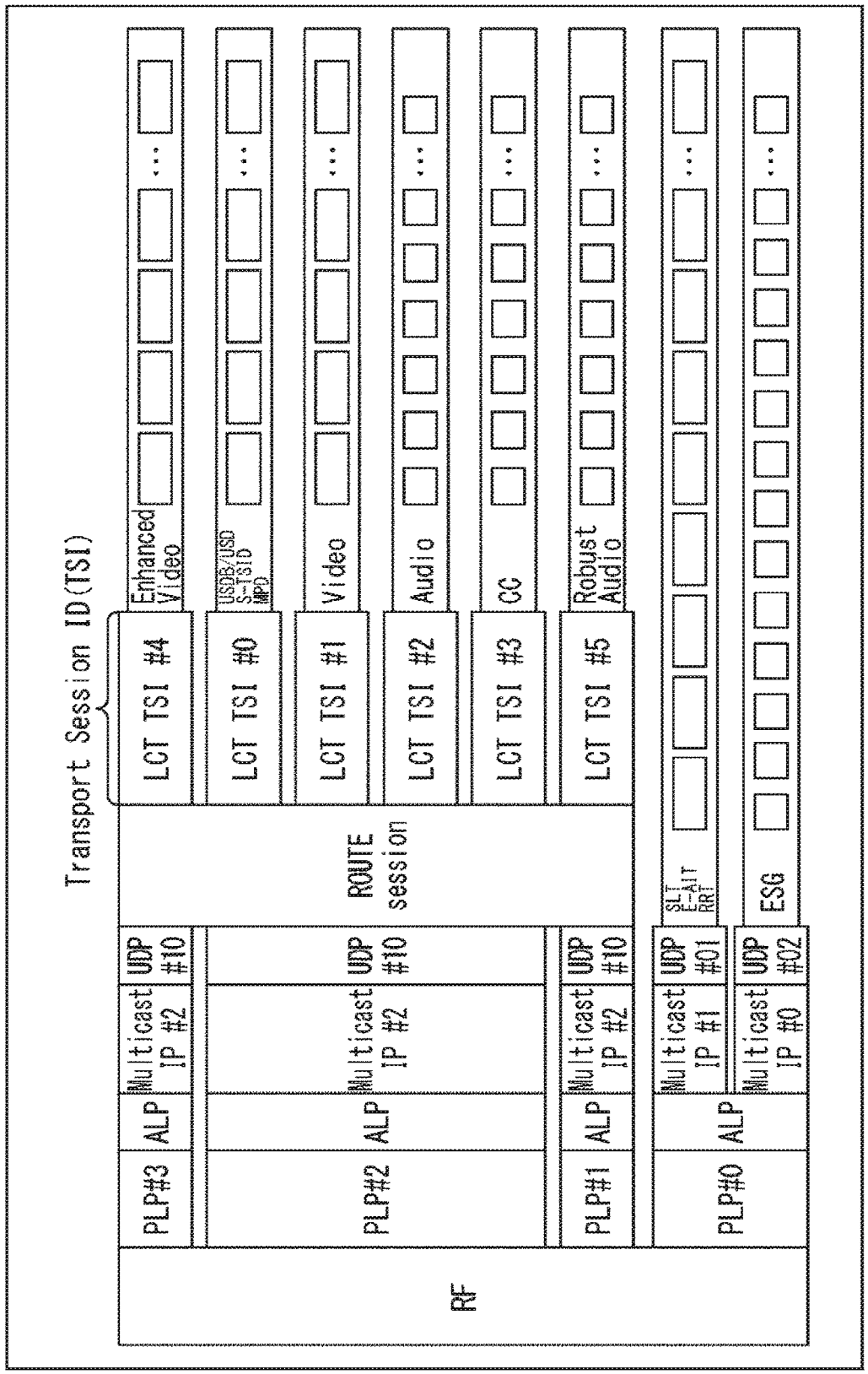
FIG. 5 is a schematic diagram depicting relations between multiple PLPs and a ROUTE session.

FIG. 5 is a schematic diagram depicting relations between multiple PLPs indicated in FIG. 4 and the ROUTE session.

In FIG. 5, the broadcast stream (RF) on a given frequency band (e.g., 6 MHz) includes multiple PLPs, i.e., PLP #0 to PLP #3. PLP #0 includes the LLS signaling and the ESG stream. PLP #1 includes the robust audio stream. PLP #2 includes video and other components and the SLS signaling stream. PLP #3 includes the enhanced video stream.

An ALP (ATSC Link-layer Protocol) packet included in PLP #0 includes IP packet #1 that includes UDP packet #01 holding the LLS signaling (data) and IP packet #0 that includes UDP packet #02 holding the ESG (data). It is to be noted that the LLS signaling and ESG stream are transmitted not in the ROUTE session but over IP/UDP.

Note that the combination of a symbol "#" and a number described in the UDP and IP packets represents a port number and an IP address. For example, IP packet #1 including UDP packet #01 means that the IP address "1" and the port number "01" are added. As another example, IP packet #0 including UDP packet #02 means that the IP address "0" and the port number "02" are added.

It is to be noted that these IP addresses and port numbers are described simply to indicate, for the purpose of convenience, that the same or different IP addresses and port numbers are added. These IP addresses and port numbers are different from the actually added IP addresses and port numbers. Furthermore, these relations also apply to other drawings, to be discussed later.

An ALP packet included in PLP #1 includes IP packet #2 that includes UDP packet #10 holding robust audio (data). The robust audio stream, it is to be noted, is transmitted in the ROUTE session.

The ALP packet included in PLP #2 includes IP packet #2 that includes UDP packet #10 holding video (base video) and audio components, a caption component, and SLS signaling (data). The video and audio components, caption component and SLS signaling stream, it is to be noted, are transmitted in the ROUTE session.

The ALP packet included in PLP #3 includes IP packet #2 that includes UDP packet #10 holding enhanced video (data). The enhanced video stream, it is to be noted, is transmitted in the ROUTE session.

Here, in a case where the streams of video and audio components and signaling are transmitted in the ROUTE session, the file data of the components and signaling are segmented in compliance with specifications of the ISO BMFF (Base Medial File Format). The resulting segmented data are placed in LCT packets and transmitted.

Furthermore, in the ROUTE session, the data of files to be transmitted (segmented data) is managed as a single object using a TOI (Transport Object ID). Also, an aggregate of multiple objects is managed as a single session using a TSI (Transport Session ID). That is, in the ROUTE session, two kinds of identification information TSI and TOI may be used to identify specific data.

In the ROUTE session of FIG. 5, the SLS signaling stream (segmented data) is transmitted using TSI #0, for example. Also, in the ROUTE session of FIG. 5, the video, audio, and caption streams (segmented data) are transmitted using TSI #1 to TSI #3 individually, for example. The enhanced video stream (segmented data) and the robust audio stream (segmented data) are transmitted using TSI #4 and TSI #5, respectively.

Note that in the IP transmission system 2 (FIG. 3), the receiving-side reception apparatus 21 handling packets and ROUTE sessions resolves the IP address and the port number involved by analyzing information included in the SLT metadata, for example. The reception apparatus 21 further resolves the information within the ROUTE session by analyzing the information included in the S-TSID metadata. Furthermore, the reception apparatus 21 on the receiving side further analyzes the information included in the MPD metadata to determine, for example, whether video and audio components are to be delivered through broadcast or through communication and, if the video and other components are to be delivered through communication, to identify the URL (Uniform Resource Locators) of the servers on the Internet as the destinations for the delivery.
(Flow of Data on the Transmitting Side)

Figure 6:
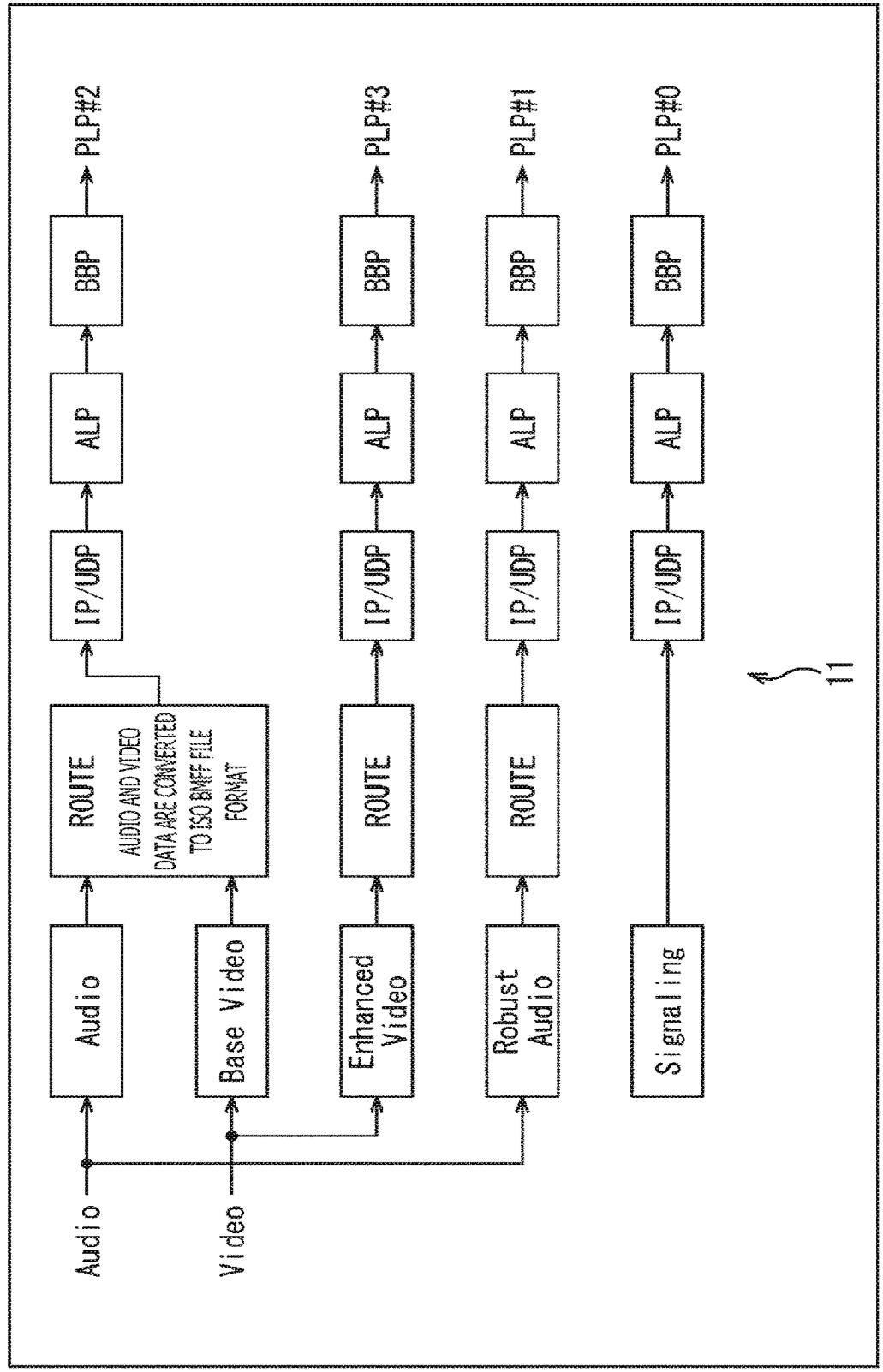
FIG. 6 is a schematic diagram depicting a flow of data processed by the transmitting side.

FIG. 6 is a schematic diagram depicting a flow of data processed by the transmission apparatus 11 (FIG. 3) on the transmitting side.

In FIG. G, video and audio data as well as signaling data are input to the transmission apparatus 11.

It is to be noted that the video data corresponding to the base layer (base video data) and the enhanced video data corresponding to the enhancement layer (enhanced video data) are input as the video data. Furthermore, the normal audio data and the robust audio data are input as the audio data.

Furthermore, although there are two kinds of signaling, i.e., LLS signaling and SLS signaling, only the LLS signaling is described here for the purpose of simplified explanation. Also, the caption component (CC) and ESG stream are omitted for purpose of simplification.

In order to transmit video (base video) and audio data in the ROUTE session, the transmission apparatus 11 performs the process of converting the data to an ISO BMFF file format (e.g., process of segmenting the data in accordance with ISO BMFF specifications). The video and audio data converted to the ISO BMFF file format are placed in an IP packet including a UDP packet (IP/UDP). Furthermore, one or multiple IP packets are placed in an ALP packet. Multiple ALP packets are placed in a baseband packet (BBP) that in turn is included in PLP #2.

Likewise, the enhanced video data is converted to the ISO BMFF file data format and placed in an IP packet (IP/UDP). Multiple ALP packets including the IP packet are then placed in a BBP that is included in PLP #3. Also in like manner, the robust audio data is converted to the ISO BMFF file format and placed in an IP packet (IP/UDP). Multiple ALP packets including the IP packet are then placed in a BBP that is included in PLP #1. Note that the LLS signaling data is placed in an IP packet (IP/UDP), and multiple ALP packets including the IP packet are placed in a BBP that is included in PLP #0.
(Flow of Data on Receiving Side)

Figure 7:
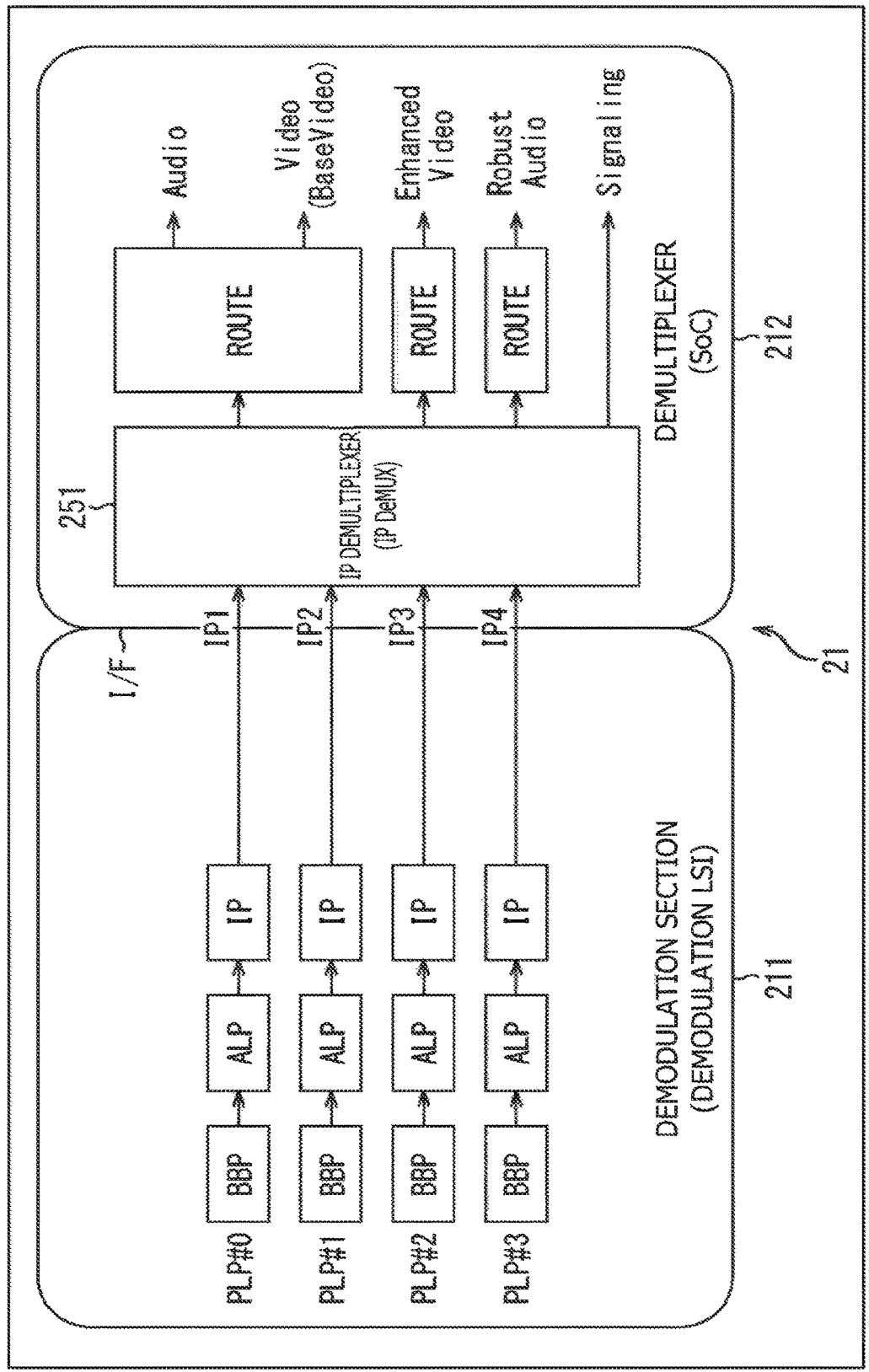
FIG. 7 is a schematic diagram depicting a flow of data processed by the receiving side.

FIG. 7 is a schematic diagram depicting a flow of data processed by the reception apparatus 21 (FIG. 3) on the receiving side.

In FIG. 7, the reception apparatus 21 includes a demodulation section 211 as demodulation LSI and a demultiplexer 212 as a system-on-chip (SoC).

The demodulation section 211 performs a demodulation process to extract a BBP (Baseband Packet) from PLP #0 and multiple ALP packets from the BBP. The demodulation section 211 outputs one or multiple IP packets extracted from the ALP packets to the demultiplexer 212 via a predetermined interface (I/F).

Likewise, the demodulation section 211 performs a demodulation process on PLP #1 to PLP #3 to extract ALP packets from the BBP (Baseband Packet) in each PLP. The demodulation section 211 outputs the IP packet extracted from the ALP packets in each PLP to the demultiplexer 212 via the interface (I/F).

The demultiplexer 212 inputs to an IP demultiplexer 251 the IP packet input from the demodulation section 211 via the interface (I/F). The IP demultiplexer 251 processes the input IP packet to demultiplex data to be transmitted in the ROUTE session, for example.

Demultiplexed in this case are the LLS signaling data included in PLP #0, the robust audio data included in PLP #1, the video (base video) and audio data included in PLP #2, and the enhanced video data included in PLP #3, for example.

The IP demultiplexer 251 outputs the video (base video) and enhanced video data to a downstream video decoder (not depicted) and the audio and robust audio data to a downstream audio decoder (not depicted). Also, the IP demultiplexer 251 outputs the signaling data such as the LLS signaling to a downstream control section (not depicted), for example.

In the reception apparatus 21, the demodulation section 211 configured as an RF IC or demodulation LSI and the demultiplexer 212 configured as a system-on-chip (SoC) are provided as two different chips. Because four IP streams (IP1 to IP4) from the demodulation section 211 are input to the demultiplexer 212, four interfaces (I/F) are needed to address the four IP streams.

However, it is preferred that the reception apparatus 21 supporting the IP transmission method also have a single interface (I/F) instead of multiple interfaces (I/F) configured between the demodulation section 211 (RF IC or demodulation LSI) and the demultiplexer 212 (system-on-chip (SoC)), as in the case of the reception apparatus 20 (FIG. 1, etc.) supporting the above-mentioned MPEG2-TS method or the M-PLP method according to DVB-T2.

One reason for the preferred configuration above is that the chips such as the demodulation LSI acting as the demodulation section 211 and the system-on-chip (SoC) as the demultiplexer 212 are subject to pin count constraints. Furthermore, another reason is that multiple interfaces (I/F), if implemented, could lead to enlarging the size of the chips or raising their costs.

Also, it is considered that a high-speed serial interface might be used as a single interface (I/F). However, implementing such an interface would typically require using a complicated protocol or dealing with severe restrictions of physical tolerance. The increased costs thus incurred makes this option impractical.

The present technology proposes methods by which a single interface (I/F) instead of multiple interfaces (I/F) is caused to connect a demodulation section 221 configured as demodulation LSI with a demultiplexer 222 configured as a system-on-chip (SoC) in the reception apparatus 21 (FIG. 3). Explained below are the methods for implementing a single interface (I/F) between the demodulation section 221 as demodulation LSI and the demultiplexer 222 as a system-on-chip (SoC).

(IP Transmission System of Present Technology)

FIG. 8 is a schematic diagram depicting a typical configuration of an IP transmission system to which the present technology is applied.

In FIG. 8, an IP transmission system 3 includes a transmission apparatus 12 and a reception apparatus 22.

The transmission apparatus 12 is a transmitter that supports the IP transmission method and transmits a broadcast stream including content such as broadcast programs via a transmission path 32. The reception apparatus 22 is a receiver that supports the IP transmission method and receives a broadcast stream transmitted from the transmission apparatus 12 via the transmission path 32 to reproduce content such as broadcast programs.

Furthermore, as discussed above, according to the ATSC 3.0 standard, for example, the transmission apparatus 12 on the transmitting side supports up to 64 PLPs on a given frequency band. On the other hand, the reception apparatus 22 on the receiving side needs to receive up to four PLPs simultaneously. That is, the reception apparatus 22 on the receiving side is caused to receive multiple PLPs simultaneously so as to provide the audio of higher robustness and the video of higher quality, for example.

As with the transmission apparatus 11 in FIG. 3, the transmission apparatus 12 includes a multiplexer 121 and a modulation section 122.

The multiplexer 121, as with the multiplexer 111 in FIG. 3, processes input multiple IP streams (IP1 to IPn) and supplies what is processed to the modulation section 122. According to the ATSC 3.0 standard, it is to be noted, up to 64 IP streams are input on a given frequency band corresponding to the PLPs.

As with the modulation section 112 in FIG. 3, the modulation section 122 performs processes related to the physical layer (PHY) such as an error correction encoding process and a modulation process on multiple IP streams (IP1 to IPn) supplied from the multiplexer 121. The modulation section 122 obtains a signal from the processing and transmits the signal as a digital broadcast signal via an antenna.

The digital broadcast signal transmitted from the transmission apparatus 12 is received by the reception apparatus 22 via the transmission path 32 for terrestrial broadcasts, for example.

The reception apparatus 22 includes a demodulation section 221 and a demultiplexer 222.

The demodulation section 221 is typically configured as an RF IC or demodulation LSI that performs processes related to the physical layer (PHY). The demodulation section 221 carries out such processes as a demodulation process (e.g., OFDM demodulation) and an error correction decoding process (e.g., LDPC decoding or BCH decoding), as well as processes related to packets such as the IP packet on the input signal. The demodulation section 221 obtains one IP stream (IP) from the processing and supplies the IP stream to the demultiplexer 212.

The demultiplexer 212 is typically configured as a system-on-chip (SoC). The demultiplexer 212 processes the single IP stream (IP) supplied from the demodulation section 211, and outputs an IP stream corresponding to a selected broadcast program to downstream circuits. Note that the downstream circuits perform processes such as that of decoding the video and audio data included in the IP stream so as to reproduce the selected broadcast program (content).

In the reception apparatus 22 of FIG. 8, the demodulation section 221 configured as an RF IC or demodulation LSI and the demultiplexer 222 configured as a system-on-chip (SoC) are provided as two different chips. These chips are interconnected via a single interface (I/F). That is, in the reception apparatus 22 supporting the IP transmission method according to the ATSC 3.0, for example, the IP stream (IP)

output from the demodulation section 221 is input to the demultiplexer 222 via the single interface (I/F).

Explained below with reference to FIGS. 9 to 17 are the methods by which the reception apparatus 22 is caused to implement a single interface (I/F) between the demodulation section 221 and the demultiplexer 222.

Note that in FIG. 8, the reception apparatus 22 may be either a stationary receiver such as a TV set, a set-top box (STB), or a video recorder; or a mobile receiver such as a mobile phone, a smartphone, or a tablet terminal. Furthermore, the reception apparatus 22 may alternatively be an onboard device mounted on a vehicle.

Also, in the IP transmission system 3 of FIG. 8, only one reception apparatus 22 is depicted for purpose of simplification. In practice, multiple reception apparatuses 22 may be provided. The broadcast stream transmitted from the transmission apparatus 12 may be received simultaneously by the multiple reception apparatuses 22.

Also, multiple transmission apparatuses 12 may be provided. Each of the transmission apparatuses 12 may transmit a broadcast stream on a different channel, i.e., on a different frequency band. When offered multiple channels by the multiple transmission apparatuses 12, each reception apparatus 22 may select a desired channel to receive the corresponding broadcast stream.

Further, in the IP transmission system 3 of FIG. 8, the transmission path 32 may be a terrestrial transmission path (for terrestrial broadcasts), a satellite transmission path using BS (Broadcasting Satellites) or CS (Communication Satellites) for satellite broadcasts, or a wired transmission path using cables for wired broadcasts (CATV), for example.

<2. Methods for Implementing Single Interface for Circuits on Receiving Side>

(Methods for Implementing Single Interface for Receiving-Side Circuits)

FIG. 9 is a tabular diagram depicting typical methods for implementing a single interface (I/F) for receiving-side circuits.

Categorized broadly, there are two types of methods for implementing a single interface (I/F) for circuits on the receiving side: a method of identifying the flow of data in an IP packet (IP packet including a UDP packet) transmitted by each PLP (called the IP data flow identification method hereunder), and a method of adding PLP information associated with PLPs (called the information addition method hereunder).

The IP data flow identification method is further divided into two methods: a transmitting-side IP data flow identification method, and a receiving-side IP data flow identification method.

The transmitting-side IP data flow identification method is a method that causes the transmission apparatus 12 on the transmitting side to configure an IP system for IP data flow identification. For example, the transmission apparatus 12 on the transmitting side is caused to perform the process of allocating an IP address and a port number of an IP data flow in such a manner that their values remain unique throughout a service. Note that the transmitting-side IP data flow identification method will be described later in detail with reference to FIGS. 10 and 11.

The receiving-side IP data flow identification method is a method that causes the reception apparatus 22 on the receiving side to reallocate values for identifying an IP data flow. For example, the reception apparatus 22 on the receiving side is caused to perform the process of reallocating the IP address and the port number of the IP data flow in such a manner that their values become unique. Note that the receiving-side IP data flow identification method will be described later in detail with reference to FIG. 12.

Furthermore, the information addition method is further divided into three methods: a transmitting-side information addition method, a receiving-side information addition method 1, and a receiving-side information addition method 2.

The transmitting-side information addition method is a method that causes the transmission apparatus 12 on the transmitting side to add PLP information to data. For example, the transmission apparatus 12 on the transmitting side is caused to perform the process of including the PLP information including PLP IDs for PLP identification into an extension header of a packet, for example. Note that the transmitting-side information addition method will be described later in detail with reference to FIG. 13.

The receiving-side information addition method 1 and the receiving-side information addition method 2 are each a method that causes the reception apparatus 22 on the receiving side to add PLP information to data. The receiving-side information addition method 1 involves including the PLP information including PLP IDs for PLP identification into a packet (inside thereof). Note that the receiving-side information addition method 1 Will be described later in detail with reference to FIGS. 14 and 15.

On the other hand, the receiving-side information addition method 2 involves including the PLP information including PLP IDs for PLP identification outside a packet (outside thereof). Note that the receiving-side information addition method 2 will be described later in detail with reference to FIGS. 16 and 17.

The above-mentioned five methods for implementing a single interface depicted in FIG. 9 will be explained below one by one.

Figure 10:
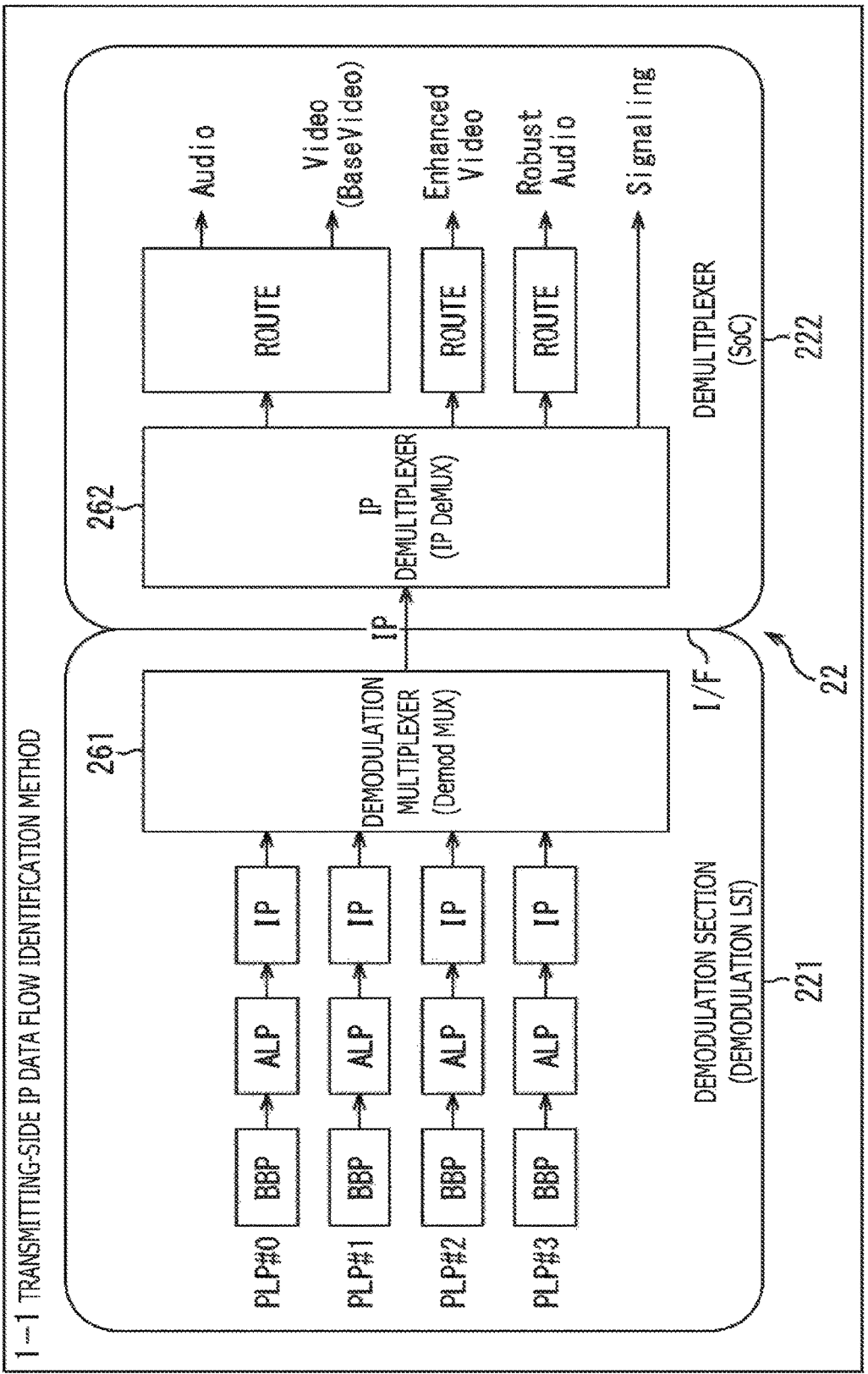
FIG. 10 is a schematic diagram depicting a flow of data processed by a reception apparatus in a case where a transmitting-side IP data flow identification method is adopted.

(1) IP Data Flow Identification Methods (1-1) Transmitting-Side IP Data Flow Identification Method FIG. 10 is a schematic diagram depicting a flow of data processed by the reception apparatus 22 in the IP transmission system 3 (FIG. 8) in a case where the transmitting-side IP data flow identification method is adopted.

The transmitting-side IP data flow identification method, it is to be noted, causes the transmission apparatus 12 in the IP transmission system 3 (FIG. 8) to allocate the IP address and the port number of the IP data flow in such a manner that their values become unique throughout a service. In this case, for example, the IP address and the port number are given values in a unique combination throughout a single service including multiple PLPs. That is, the IP address and the port number constitute unique values guaranteed by a broadcaster (broadcasting station).

The broadcast stream including such an IP data flow is received by the reception apparatus 22 in FIG. 10 via the transmission path 32.

In FIG. 10, the reception apparatus 22 includes the demodulation section 221 and the demultiplexer 222. In the reception apparatus 22, the demodulation section 221 configured as demodulation LSI and the demultiplexer 222 configured as a system-on-chip (SoC) are interconnected via a single interface (I/F).

The demodulation section 221 performs a demodulation process on PLP #0 to PLP #3 to extract an ALP packet from the BBP (Baseband Packet) of each PLP. An IP packet extracted from the ALP packet of each PLP is input to a demodulation multiplexer 261. The demodulation multiplexer 261 processes the IP packet input from each of PLP #0 to PLP #3 to obtain one IP stream (IP). The demodulation multiplexer 261 then outputs the IP stream (IP) to the downstream demultiplexer 222 via a single interface (I/F).

In the demultiplexer 222, one IP stream (IP) coming from the demodulation section 221 (i.e., from the demodulation multiplexer 261 thereof) via the single interface (I/F) is input to an IP demultiplexer 262. The IP demultiplexer 262 processes the IP packets included in the input IP stream (IP) to demultiplex the data to be transmitted in a ROUTE session, for example.

The IP demultiplexer 262 outputs video (base video) and enhanced video data to a downstream video decoder (not depicted) and audio and robust audio data to a downstream audio decoder (not depicted). Also, the IP demultiplexer 262 outputs the signaling data such as the LLS signaling to a downstream control section (not depicted), for example.

Figure 11:
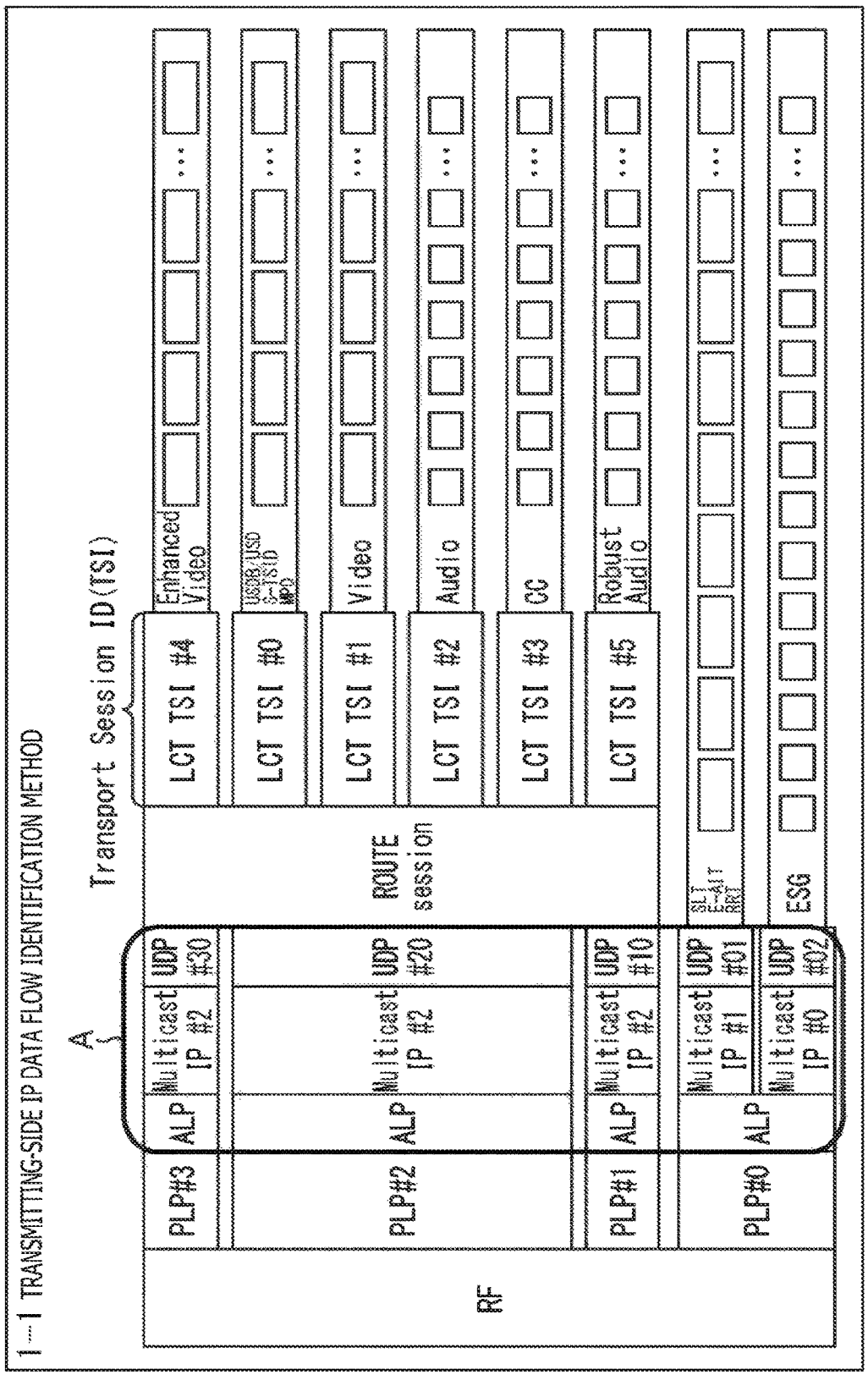
FIG. 11 is a schematic diagram depicting an IP data flow applicable in a case where the transmitting-side IP data flow identification method is adopted.

FIG. 11 is a schematic diagram depicting an IP data flow applicable in a case where the transmitting-side IP data flow identification method is adopted.

In FIG. 11, a broadcast stream (RF) includes four PLPs, i.e., PLP #0 to PLP #3. The ALP packet included in PLP #0 and holding ESG and LLS signaling (data) includes IP packets #0 and #1 including UDP packets #02 and #01, respectively.

The ALP packet included in PLP #1 includes IP packet #2 including UDP packet #10. Also, the ALP packet included in PLP #2 includes IP packet #2 including UDP packet #20. Further, the ALP packet included in PLP #3 includes IP packet #2 including UDP packet #30. It is to be noted that the ALP packets included in PLP #1 to PLP #3 include the IP packets (IP packets including UDP packets) holding data for a ROUTE session.

That is, if the inside of frame A in FIG. 11 is considered, the transmission apparatus 12 (FIG. 8) on the transmitting side allocates the IP address of an IP packet and the port number of a UDP packet in each PLP in such a manner that their values are in a unique combination for each PLP, with IP packet #0 including UDP packet #02 and IP packet #1 including UDP packet #01 in PLP #0, IP packet #2 including UDP packet #10 in PLP #1, IP packet #2 including UDP packet #20 in PLP #2, and IP packet #2 including UDP packet #30 in PLP #3, for example.

In the reception apparatus 22 on the receiving side, the above allocations allow the demultiplexer 222 to identify to which PLP each IP packet input from the demodulation section 221 belongs, even where a single interface (I/F) is used to transmit the IP packets obtained from each of PLP #0 to PLP #3 from the demodulation section 221 to the demultiplexer 222.

According to the transmitting-side IP data flow identification method, as described above, the transmission apparatus 12 on the transmitting side allocates the IP address and the port number of the IP data flow in such a manner that their values become unique. This allows the reception apparatus 22 on the receiving side to identify to which PLP each of the IP packets belongs even when they are transmitted via a single interface (I/F). When a single interface (I/F) is thus implemented for the circuits on the receiving side, the receiving-side circuits are configured at lower costs as a result.

(1-2) Receiving-Side IP Data Flow Identification Method

Figure 12:
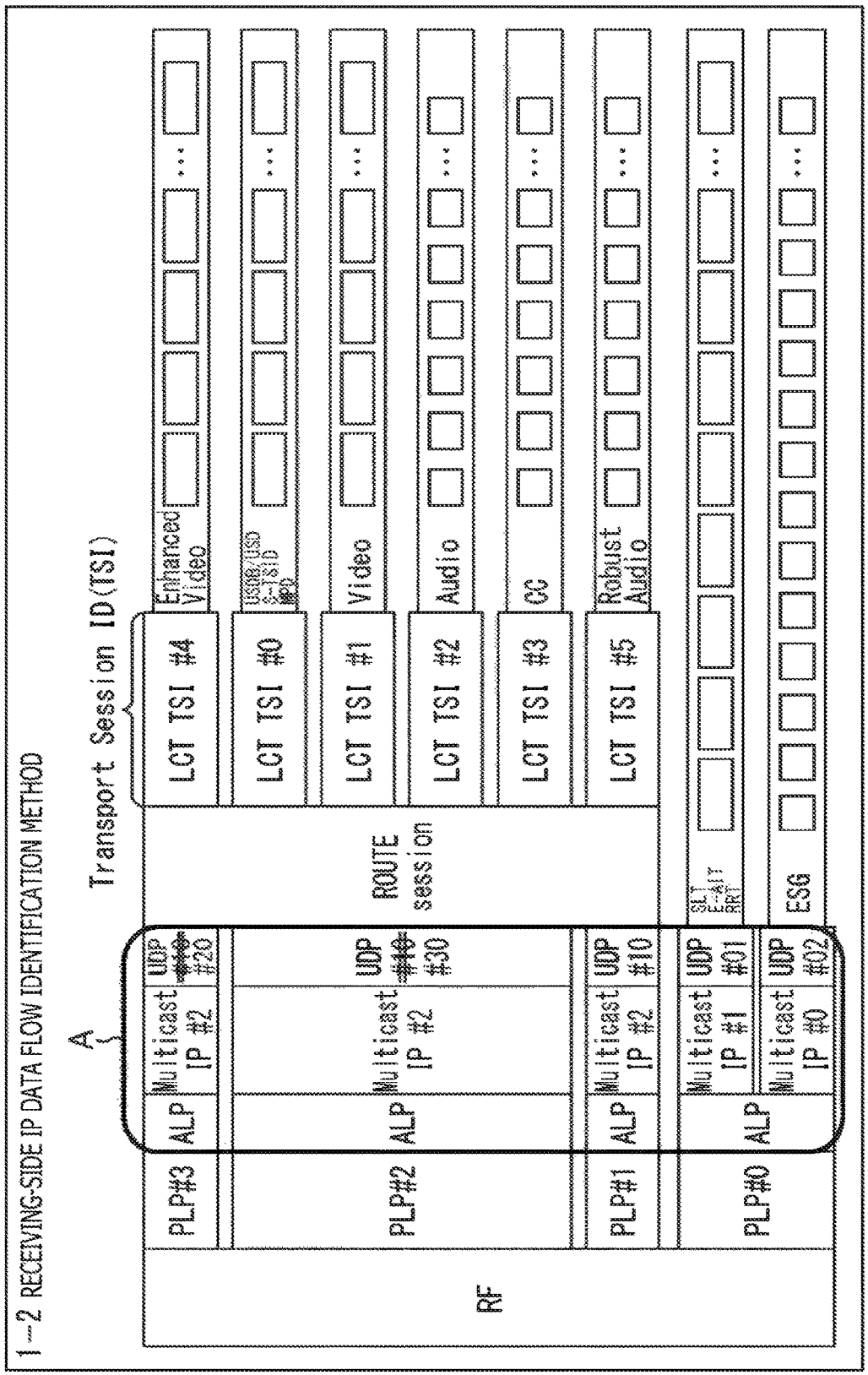
FIG. 12 is a schematic diagram depicting an IP data flow applicable in a case where a receiving-side IP data flow identification method is adopted.

FIG. 12 is a schematic diagram depicting an IP data flow applicable in a case where the receiving-side IP data flow identification method is adopted.

Unlike the above-described transmitting-side IP data flow identification method, the receiving-side IP data flow identification method does not cause the transmission apparatus 12 in the IP transmission system 3 (FIG. 8) to perform the process of allocating the IP address and the port number of the IP data flow in a unique combination. That is, according to the receiving-side IP data flow identification method, the IP address and the port number do not constitute unique values guaranteed by the broadcaster (broadcasting station).

In FIG. 12, a broadcast stream (RF) includes four PLPs, i.e., PLP #0 to PLP #3. The ALP packet included in PLP #0 and holding ESG and LLS signaling (data) includes IP packets #0 and #1 including UDP packets #02 and #01, respectively.

The ALP packet included in PLP #1 includes IP packet #2 including UDP packet #10. Also, the ALP packet included in PLP #2 includes IP packet #2 including UDP packet #10 (the value is depicted crossed out by a double crossed line). Further, the ALP packet included in PLP #3 includes IP packet #2 including UDP packet #10 (the value is depicted crossed out by a double crossed line). It is to be noted that the ALP packets included in PLP #1 to PLP #3 include the IP packets (IP packets including UDP packets) holding data for the ROUTE session.

That is, if the inside of frame A in FIG. 12 is considered, the transmission apparatus 12 (FIG. 8) on the transmitting side does not allocate the IP address of an IP packet and the port number of a UDP packet in a unique combination. Thus, the same IP address and the same port number are allocated to IP packet #2 including UDP packet #10 in PLP #1, to IP packet #2 including UDP packet #10 (the value is depicted crossed out by a double crossed line) in PLP #2, and to IP packet #2 including UDP packet #10 (the value is depicted crossed out by a double crossed line) in PLP #3.

In that case, the demodulation section 221 in the reception apparatus 22 performs the process of reallocating the IP address and the port number of the IP data flow in such a manner that their values are in a unique combination. For example, the demodulation section 221 changes the port number of the UDP packet included in IP packet #2 in PLP #2 from #10 to #30 (the value is depicted not crossed out by a double crossed line). Furthermore, the demodulation section 221 changes the port number of the UDP packet included in IP packet #2 in PLP #3 from #10 to #20 (the value is depicted not crossed out by a double crossed line).

Note that of the IP address and the port number, the port number is reallocated in the above case, for example. Where the IP address and the port number of the IP data flow are subjected to reallocation, at least either the IP address or the port number is reallocated.

As a result of this, as indicated inside the frame in FIG. 12, the IP address of an IP packet and the port number of a UDP packet are in a unique combination for each PLP, with IP packet #0 including UDP packet #02 and IP packet #1 including UDP packet #01 in PLP #0, IP packet #2 including UDP packet #10 in PLP #1, IP packet #2 including UDP packet #30 (the value is depicted not crossed out by a double crossed line) in PLP #2, and IP packet #2 including UDP packet #20 (the value is depicted not crossed out by a double crossed line) in PLP #3.

The above reallocations allow the demultiplexer 222 in the reception apparatus 22 on the receiving side to identify to which PLP each IP packet input from the demodulation section 221 belongs even when the IP packets obtained from PLP #0 to PLP #3 are transmitted via the single interface (I/F) from the demodulation section 221 to the demultiplexer 222.

According to the receiving-side IP data flow identification method, as described above, the reception apparatus 22 (i.e., its demodulation section 221) on the receiving side allocates (i.e., reallocates) the IP address and the port number of the IP data flow in such a manner that their values become unique. Even when IP packets are transmitted through a single interface (I/F), the reception apparatus 22 on the receiving side can identify to which PLP each IP packet belongs. When a single interface (I/F) is thus implemented for the circuits on the receiving side, the receiving-side circuits are configured at lower costs as a result.

(2) Information Addition Methods (2-1) Transmitting-Side Information Addition Method FIG. 13 is a tabular diagram depicting typical syntax for PLP information to be added to data (signals) by the transmission apparatus 12 in the IP transmission system 3 (FIG. 8) in a case where the transmitting-side information addition method is adopted.

In the PLP information (PLP_info) depicted in FIG. 13, a six-bit field "PLP_id" is set with a PLP ID identifying the PLP. Also, the PLP_id field is set with a mnemonic (bit string notation) "uimsbf" (short for unsigned integer most significant bit first). The field is handled as an integer in bit operation.

Note that a two-bit field "reserved" is an undefined field. It is to be noted that this field is set with a mnemonic (bit string notation) "bslbf" (short for bit string, left bit first). This means that the field is handled as a bit string.

The transmitting-side information addition method involves defining the PLP information including the PLP ID and getting the transmission apparatus 12 (FIG. 8) to perform the process of including the PLP information into an extension header of a packet, for example. In this case, the values of the PLP IDs are unique values guaranteed by the broadcaster (broadcasting station). Note that PLP information transmission methods will be described later with reference to FIGS. 18 to 29.

A broadcast stream including the PLP information (i.e., the packet to which the PLP information is added) is received by the reception apparatus 22 (FIG. 8) via the transmission path 32.

In the reception apparatus 22 (FIG. 8), the demodulation section 221 as demodulation LSI and the demultiplexer 222 as a system-on-chip (SoC) are interconnected by a single interface (I/F). The demodulation section 221 processes the IP packet input for each PLP (PLP #0 to PLP #3) and outputs what is processed to the downstream demultiplexer 222 via the single interface (I/F). The demultiplexer 222 processes the IP packets coming from the demodulation section 221 via the single interface (I/F), and outputs to downstream circuits the data to be transmitted in a ROUTE session, for example.

The PLP information is included in the extension header of packets, for example. Thus, in the reception apparatus 22 (FIG. 8), the demultiplexer 222 can identify to which PLP each IP packet from the demodulation section 221 belongs using the PLP ID included in the PLP information, even when the IP packets obtained from each PLP (PLP #0 to PLP #3) are transmitted from the demodulation section 221 to the demultiplexer 222 via the single interface (I/F).

Note that the PLP information may be included in diverse locations such as the extension header or the signaling of a packet, as will be discussed later with reference to FIGS. 18 to 29. It follows that the PLP information may be acquired not only by the demultiplexer 222 in processing data but also by the demodulation section 221 through data processing. In a case where the PLP information is acquired by the demodulation section 221, the demodulation section 221 notifies the demultiplexer 222 of the acquired PLP information.

According to the transmitting-side information addition method, as described above, the transmission apparatus 12 on the transmitting side adds the PLP information to data. This allows the reception apparatus 22 on the receiving side to identify to which PLP each IP packet belongs even when the IP packets are transmitted via a single interface (I/F). When a single interface is thus implemented for the circuits on the receiving side, the receiving-side circuits are configured at lower costs as a result.

(2-2) Receiving-Side Information Addition Method 1

Figure 14:
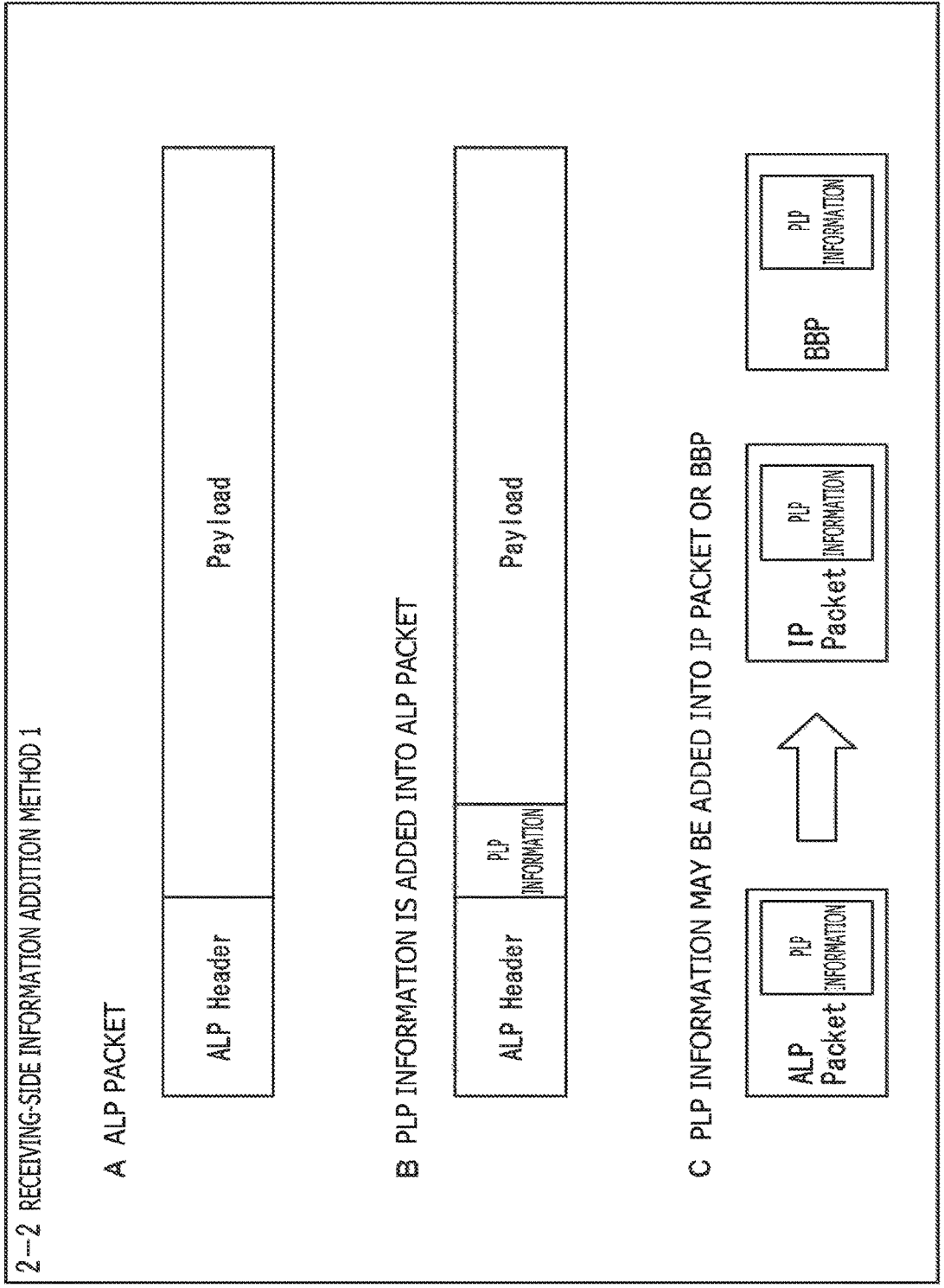
FIG. 14 is a schematic diagram depicting packet structures applicable when PLP information is added inside a packet where a receiving-side information addition method 1 is adopted.

FIG. 14 is a schematic diagram depicting packet structures applicable when PLP information is added inside a packet by the reception apparatus 22 in the IP transmission system 3 (FIG. 8) where the receiving-side information addition method 1 is adopted.

Note that unlike the above-described transmitting-side information addition method, the receiving-side information addition method 1 does not cause the transmission apparatus 12 in the IP transmission system 3 (FIG. 8) to perform the process of including PLP information into the extension header of a packet.

In FIG. 14, Subfigure A in FIG. 14 indicates the structure of an ALP packet. The ALP packet includes an ALP header and a payload. For example, PLP information may be included in the extension header of an ALP packet (ALP extension header) so as to add the PLP information inside the ALP packet, as indicated by Subfigure B in FIG. 14. It is to be noted that according to the receiving-side information addition method 1, the PLP information added inside the ALP packet includes a PLP ID identifying the PLP as in the case of the PLP information according to the transmitting-side information addition method (FIG. 13).

Figure 15:
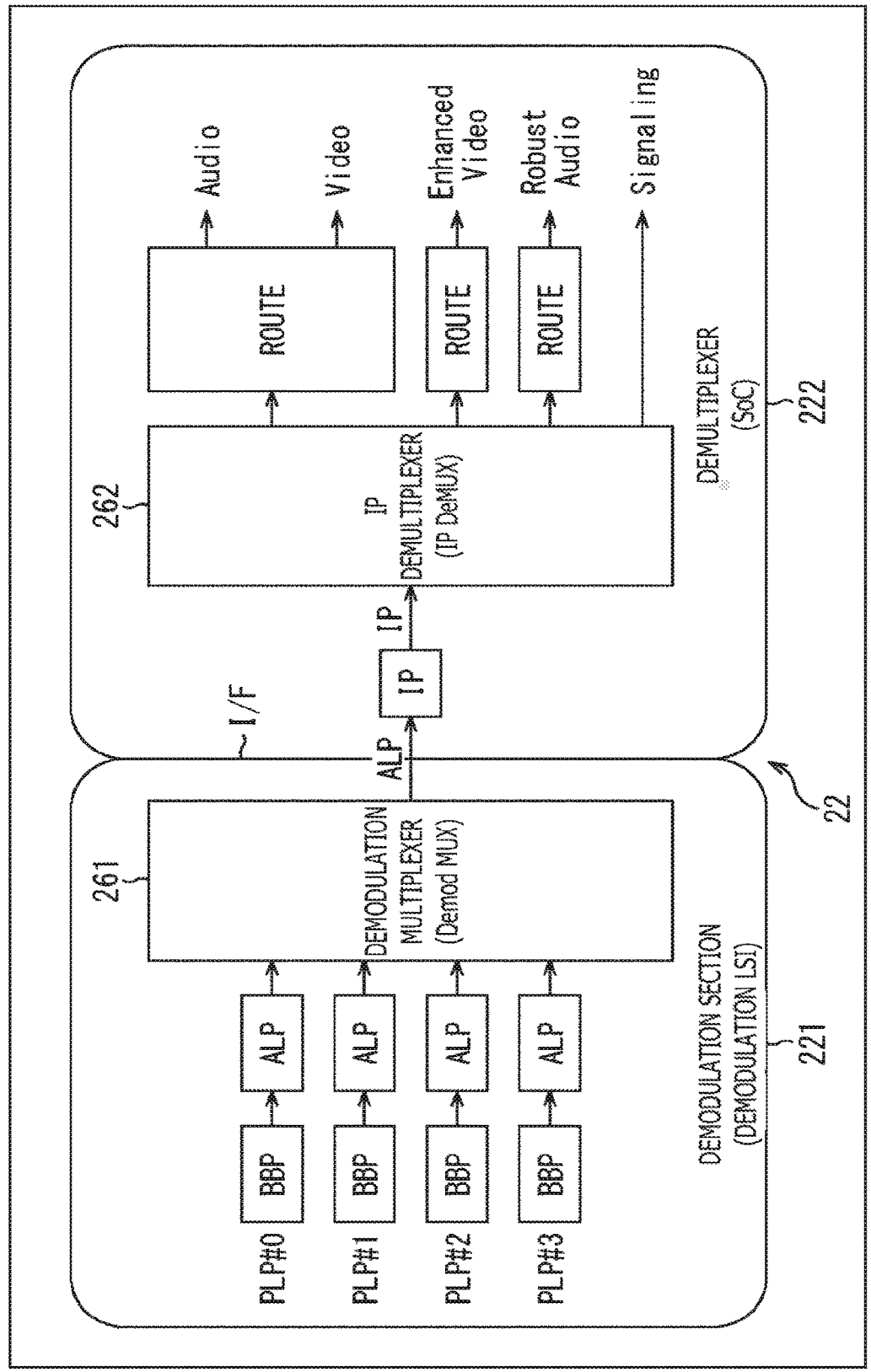
FIG. 15 is a schematic diagram depicting a flow of data processed by the reception apparatus in a case where the receiving-side information addition method 1 is adopted.

Here, as depicted in FIG. 15, when the demodulation section 221 in the reception apparatus 22 performs the process of demodulating PLP #0 to PLP #3, the ALP packet is extracted from the BBP (Baseband Packet) of each PLP and input to the demodulation multiplexer 261. The demodulation multiplexer 261 processes the ALP packet input from each PLP and outputs what is processed to the downstream demultiplexer 222 via a single interface (I/F).

It is to be noted that when processing the ALP packet input from each PLP, the demodulation multiplexer 261 causes the ALP extension header to include the PLP information including the PLP ID of the PLP of interest. That is, the reception apparatus 22 on the receiving side adds the PLP information inside the ALP packet.

The demultiplexer 222 extracts the IP packet from the ALP packet input from the demodulation section 221 (i.e., from the demodulation multiplexer 261 thereof) via a single interface (I/F). The IP demultiplexer 262 processes the extracted IP packet, and outputs to downstream circuits the data to be transmitted in a ROUTE session, for example.

The PLP information is included in the ALP extension header of the ALP packet. Thus, even when the demodulation section 221 transmits the ALP packet obtained from each PLP (PLP #0 to PLP #3) to the demultiplexer 222 via a single interface (I/F) in the reception apparatus 22, the PLP ID included in the PLP information allows the demultiplexer 222 to identify to which PLP the ALP packet (IP packet) input from the demodulation section 221 belongs.

Note that the foregoing description has depicted an example in which the PLP information is added into (inside) the ALP packet. Alternatively, the PLP information may be placed anywhere desired. For example, as indicated by Subfigure C in FIG. 14, the PLP information may be included in the extension header of an IP packet (IP extension header) in a manner adding the PLP information inside the IP packet. In another example, the PLP information may be included in the extension header of the BBP (Baseband Packet) (BBP extension header) in a manner adding the PLP information inside the BBP.

According to the receiving-side information addition method 1, as described above, the reception apparatus 22 (i.e., demodulation section 221 thereof) on the receiving side adds the PLP information into (inside) the packet. This allows the reception apparatus 22 on the receiving side to identify to which PLP each IP packet belongs even when the IP packets are transmitted via a single interface (I/F). When a single interface (I/F) is thus implemented for the circuits on the receiving side, the receiving-side circuits are configured at lower costs as a result.

(2-3) Receiving-Side Information Addition Method 2

Figure 16:
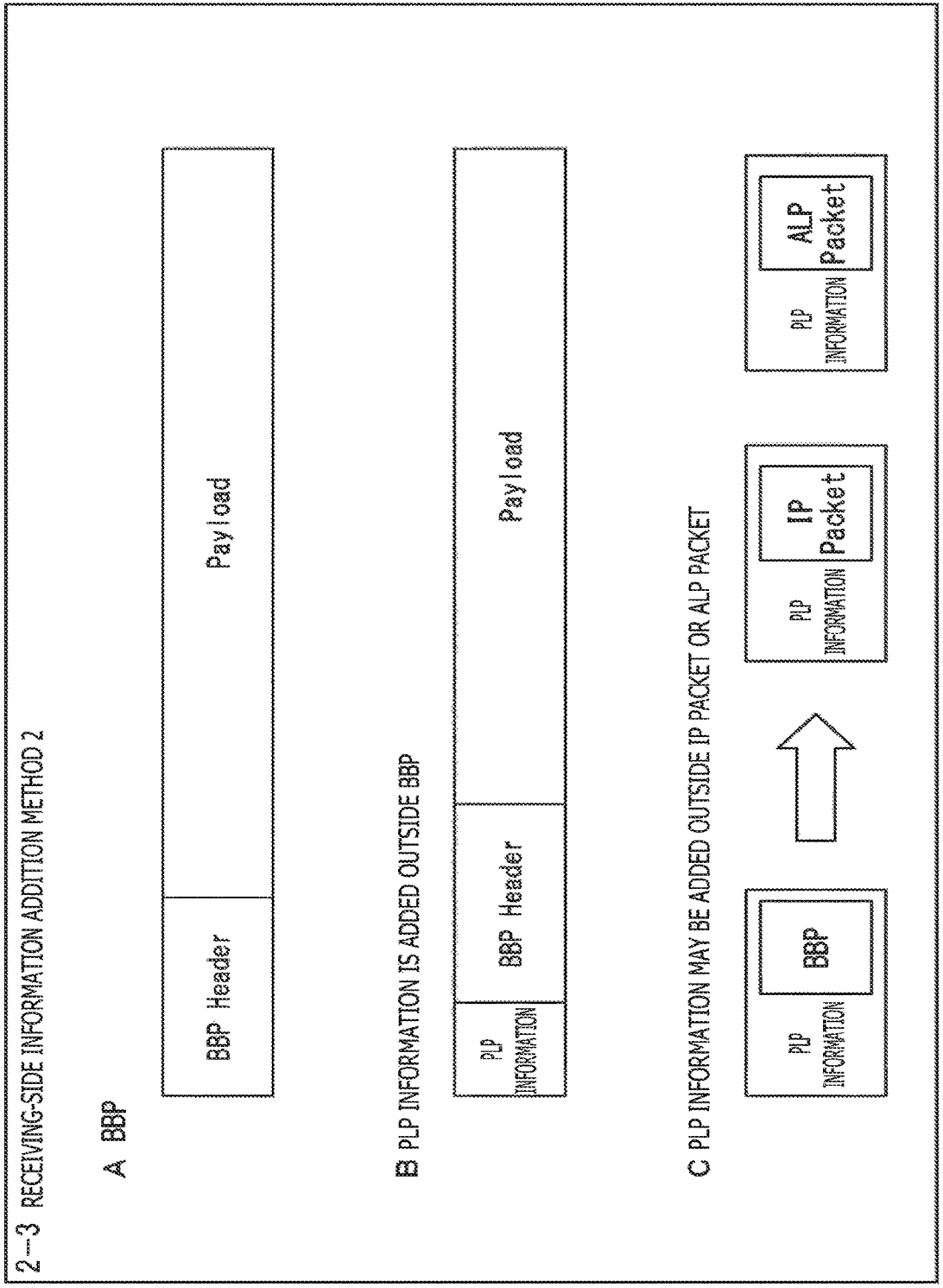
FIG. 16 is a schematic diagram depicting packet structures applicable when PLP information is added outside a packet where a receiving-side information addition method 2 is adopted.

FIG. 16 is a schematic diagram depicting packet structures applicable when PLP information is added outside a packet by the reception apparatus 22 in the IP transmission system 3 (FIG. 8) where the receiving-side information addition method 2 is adopted.

Note that unlike the above-described transmitting-side information addition method, the receiving-side information addition method 2 does not cause the transmission apparatus 12 in the IP transmission system 3 (FIG. 8) to perform the process of including PLP information into the extension header of a packet.

In FIG. 16, Subfigure A in FIG. 16 indicates the structure of a BBP (Baseband Packet). The BBP includes a BBP header and a payload. For example, the PLP information is encapsulated into the BBP in such a manner that the PLP information is added outside the BBP, as indicated by Subfigure B in FIG. 16. It is to be noted that as with the PLP information according to the transmitting-side information addition method (FIG. 13), the PLP information added outside the BBP by the receiving-side information addition method 2 includes the PLP ID identifying each PLP.

Figure 17:
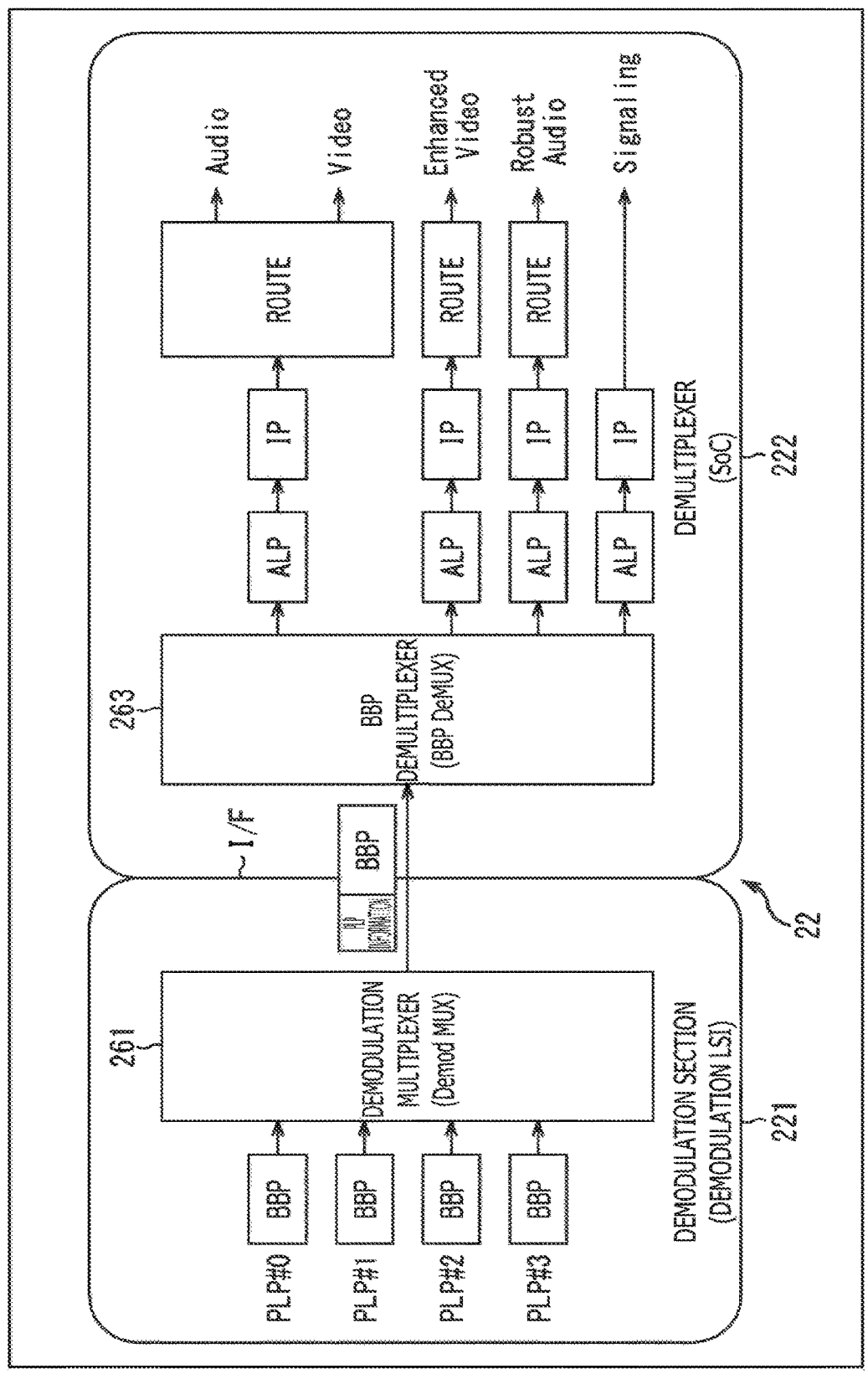
FIG. 17 is a schematic diagram depicting a flow of data processed by the reception apparatus in a case where the receiving-side information addition method 2 is adopted.

As depicted in FIG. 17, the demodulation section 221 in the reception apparatus 22 performs a demodulation process on PLP #0 to PLP #3 to extract the BBP (Baseband Packet) from each PLP. The extracted BBPs are input to the demodulation multiplexer 261. The demodulation multiplexer 261 processes the BBP input from each PLP and outputs what is processed to the downstream demultiplexer 222 via a single interface (I/F).

It is to be noted that when processing the BBP input from each PLP, the demodulation multiplexer 261 encapsulates into the BBP the PLP information including the PLP ID of the PLP of interest. That is, the reception apparatus 22 on the receiving side arranges to add the PLP information outside the BBP.

In the demultiplexer 222, the BBP (to which the PLP information is added) input from the demodulation section 221 (i.e., from the demodulation multiplexer 261 thereof) is input to a BBP demultiplexer 263 via a single interface (I/F). The BBP demultiplexer 263 processes the BBP (to which the PLP information is added) to extract the ALP packet from the BBP. The IP packet is then extracted from the ALP packet so that the data to be transmitted in a ROUTE session, for example, is output to downstream circuits.

With the PLP information encapsulated into the BBP, in the reception apparatus 22, the PLP ID included in the PLP information allows the demultiplexer 222 to identify to which PLP the BBP (ALP packet and IP packet) input from the demodulation section 221 belongs even when the BBP obtained from each PLP (PLP #0 to PLP #3) is transmitted from the demodulation section 221 to the demultiplexer 222 via a single interface (I/F).

Note that the foregoing description has depicted an example in which the PLP information is added outside the BBP (Baseband Packet). Alternatively, the PLP information may be placed anywhere desired. For example, as indicated by Subfigure C in FIG. 16, the PLP information may be encapsulated into the IP packet in a manner adding the PLP information outside the IP packet. In another example, the PLP information may be encapsulated into the ALP packet in a manner adding the PLP information outside the ALP packet.

According to the receiving-side information addition method 2, as described above, the reception apparatus 22 (i.e., demodulation section 221 thereof) on the receiving side adds the PLP information outside the packet. This allows the reception apparatus 22 on the receiving side to identify to which PLP each IF packet belongs even when the IP packets are transmitted via a single interface (I/F). When a single interface (I/F) is thus implemented for the circuits on the receiving side, the receiving-side circuits are configured at lower costs as a result.

<3. PLP Information Transmission Methods>

(Overview of PLP Information Transmission Methods)

Figure 18:
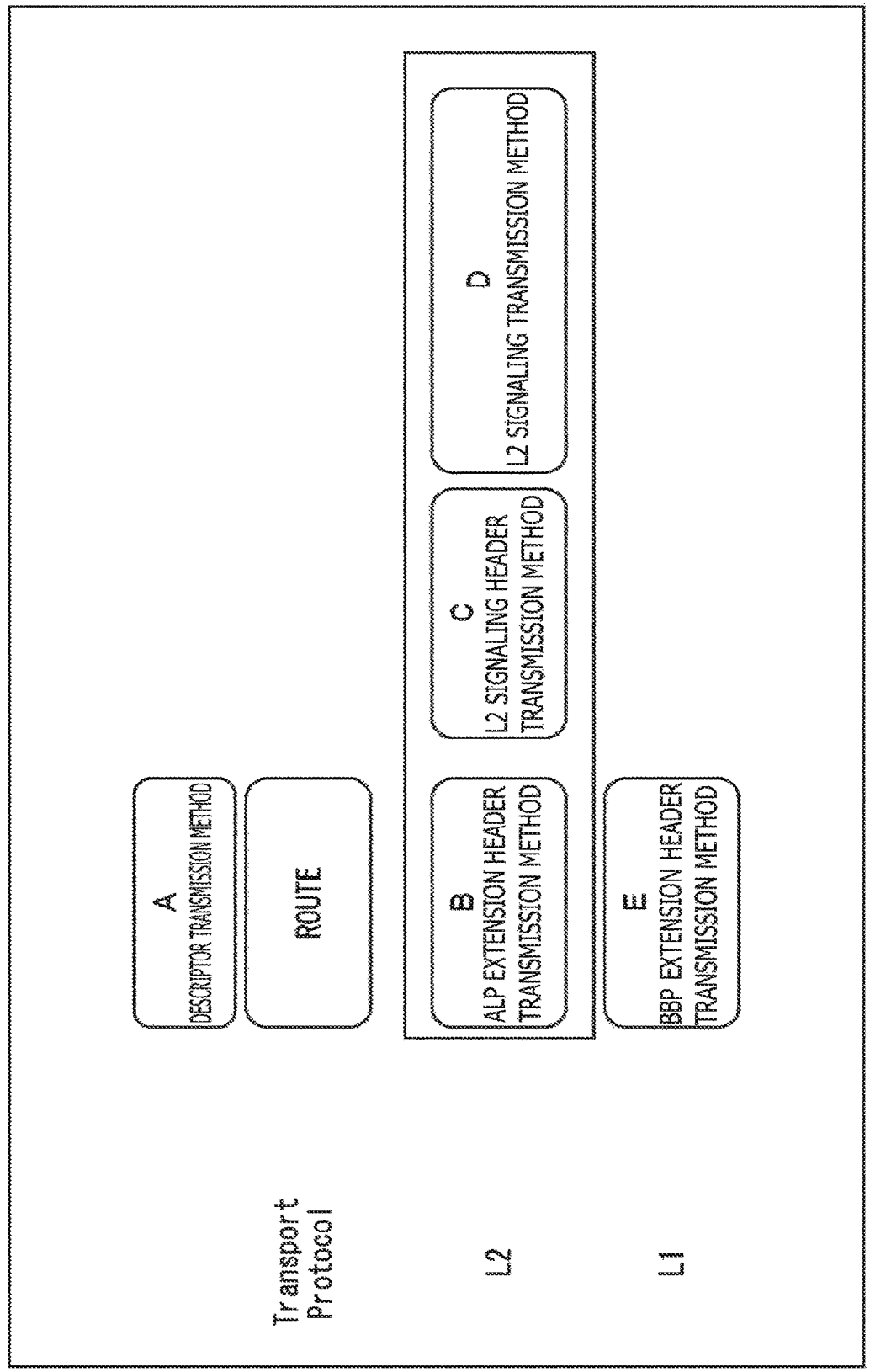
FIG. 18 is a schematic diagram outlining PLP information transmission methods.

FIG. 18 is a schematic diagram outlining the PLP information transmission methods.

Figure 19:
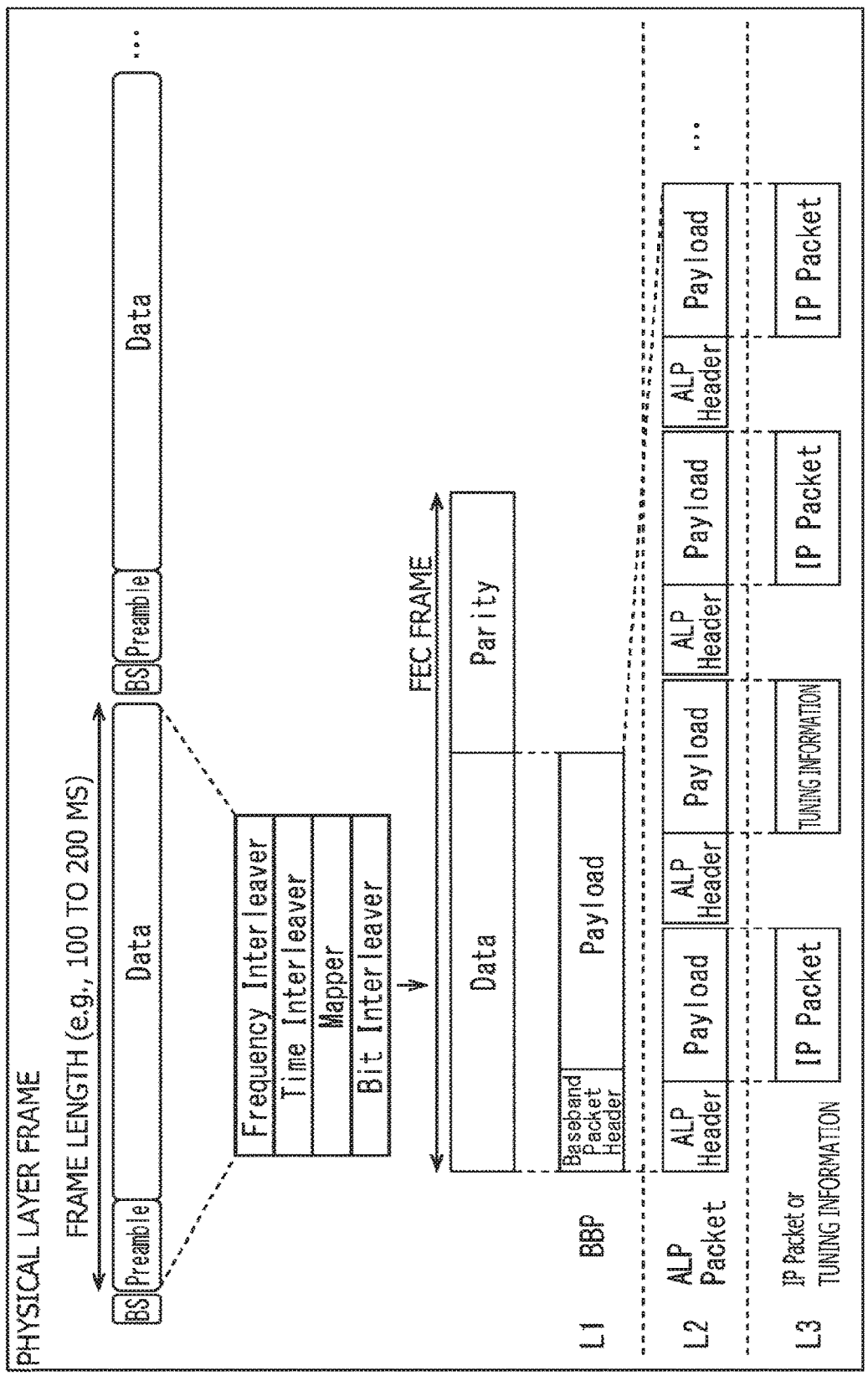
FIG. 19 is a schematic diagram depicting structures of different layers.

In a case where the above-described transmitting-side information addition method is adopted, the PLP information may be transmitted using any one of the following five transmission methods (A) to (E), for example:

(A) Descriptor transmission method
(B) ALP extension header transmission method
(C) L2 signaling header transmission method
(D) L2 signaling transmission method
(E) BBP extension header transmission method As depicted in FIG. 19, the protocol stack of the IP transmission method has a hierarchical structure including layer 1 (L1) as the physical layer, layer 2 (L2) above layer 1, and layer 3 (L3) above layer 2.

In layer 3 (L3), the IP packet or tuning information is transmitted. The tuning information, it is to be noted, may be included in the LLS signaling that in turn may be placed in the IP packet, for example.

The IP packet includes an IP header and a payload. The payload of the IP packet includes component data such as video and audio data as well as signaling data such as SLS signaling. In a case where the descriptor transmission method is used, the PLP information as a descriptor is placed in the payload of the IP packet, for example.

In layer 2 (L2), the ALP packet as a transmission packet is transmitted. The ALP packet includes an ALP header and a payload. At least one IP packet or tuning information is placed and encapsulated into the payload of the ALP packet.

Here, in a case where the ALP extension header transmission method is used, the PLP information is placed in the extension header of the ALP packet. Also, in a case where the L2 signaling header transmission method is used, the PLP information is placed in the header of the L2 signaling included in the payload of the ALP packet. Further, in a case where the L2 signaling transmission method is used, the PLP information as the L2 signaling is placed in the payload of the ALP packet.

In layer 1 (L1), the BBP (Baseband Packet) as a transmission packet is transmitted. The BBP includes a BBP header (Baseband Packet Header) and a payload. At least one ALP packet is placed and encapsulated into the payload of the BBP. Here, in a case where the BBP extension header transmission method is used, the PLP information is placed in the extension header of the BBP.

Also, in layer 1, the data obtained by scrambling at least one BBP is mapped to an FEC frame. A parity bit is added to the FEC frame for error correction of the physical layer.

Here, a physical layer frame (physical frame) of layer 1 (L1) includes a bootstrap (BS), a preamble, and a data part (Data). Then, mapped to the data part of the physical layer frame is the data obtained by performing physical layer processing (modulation process) in which, for example, bit interleaving is carried out on multiple FEC frames followed by a mapping process that in turn is followed by further interleaving in the time and frequency directions. Note that the frame length of the physical layer frame is 100 to 200 ms, for example.

Each of the five transmission methods (A) to (E) depicted in FIG. 18 is described below in detail.

(A) Descriptor Transmission Method

Described first with reference to FIG. 20 is the descriptor transmission method. The descriptor transmission method involves transmitting the PLP information (PLP_info) as the descriptor using the IP packet including the UDP packet, as in the case of the LLS signaling.

In the PLP information (descriptor) depicted in FIG. 20, an eight-bit field "PLP_info_id" is set with an ID identifying the type of the descriptor. A six-bit field "PLP_id" is set with a PLP ID identifying the PLP. Note that a two-bit field "reserved" is an undefined field.

As described above, the descriptor including the PLP information is transmitted in the IP packet using the descriptor transmission method as the transmission format for PLP information transmission. This allows the reception apparatus 22 (FIG. 8) to extract the PLP information (descriptor) included in the IP packet. The demultiplexer 222 in the reception apparatus 22 (FIG. 8) is thus able to identify to which PLP the IP packet input from the demodulation section 221 belongs by use of the PLP ID included in the PLP information.

(B) ALP Extension Header Transmission Method

Figure 21:
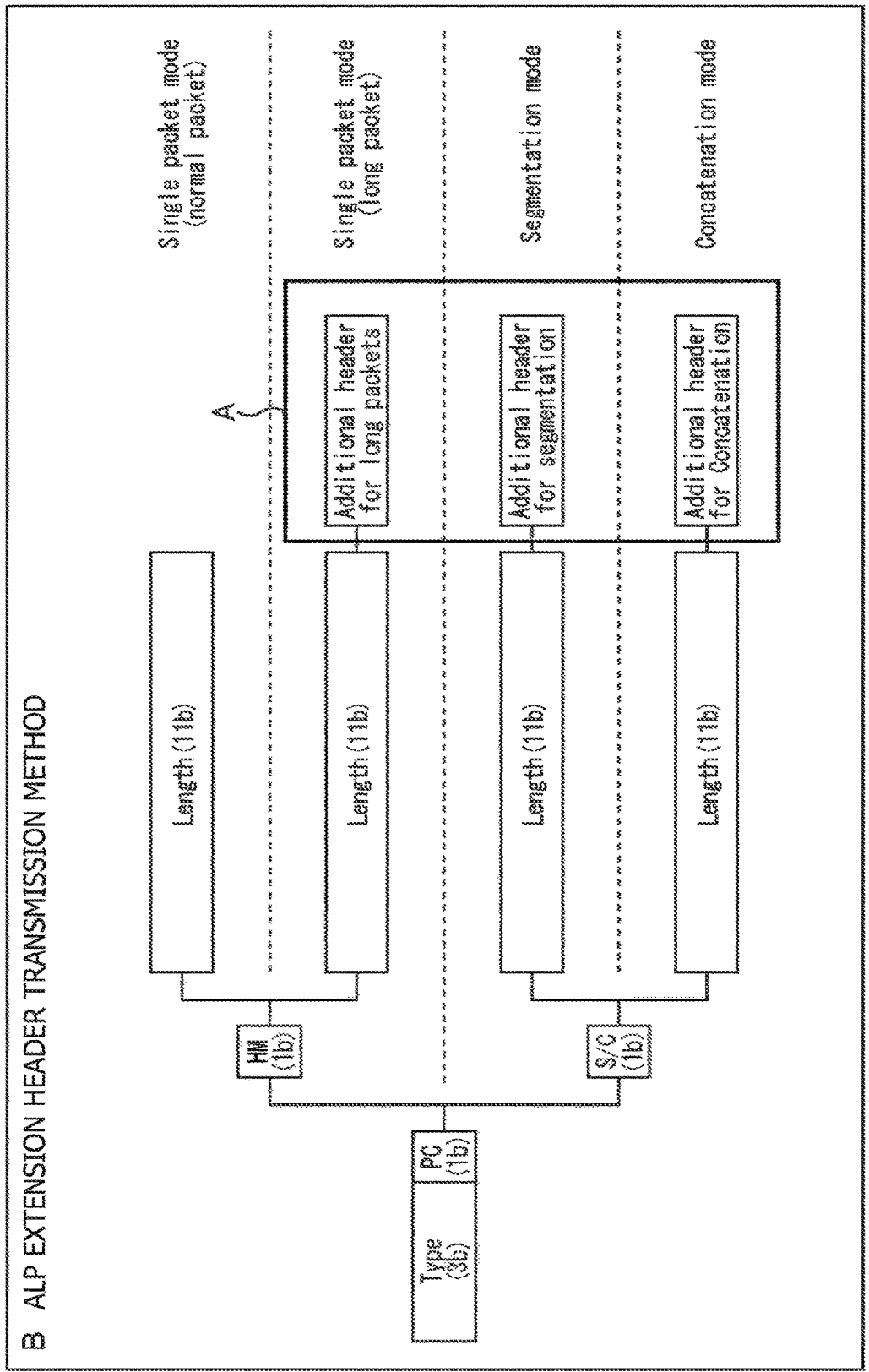
FIG. 21 is an explanatory diagram explaining an ALP extension header transmission method.
Figure 22:
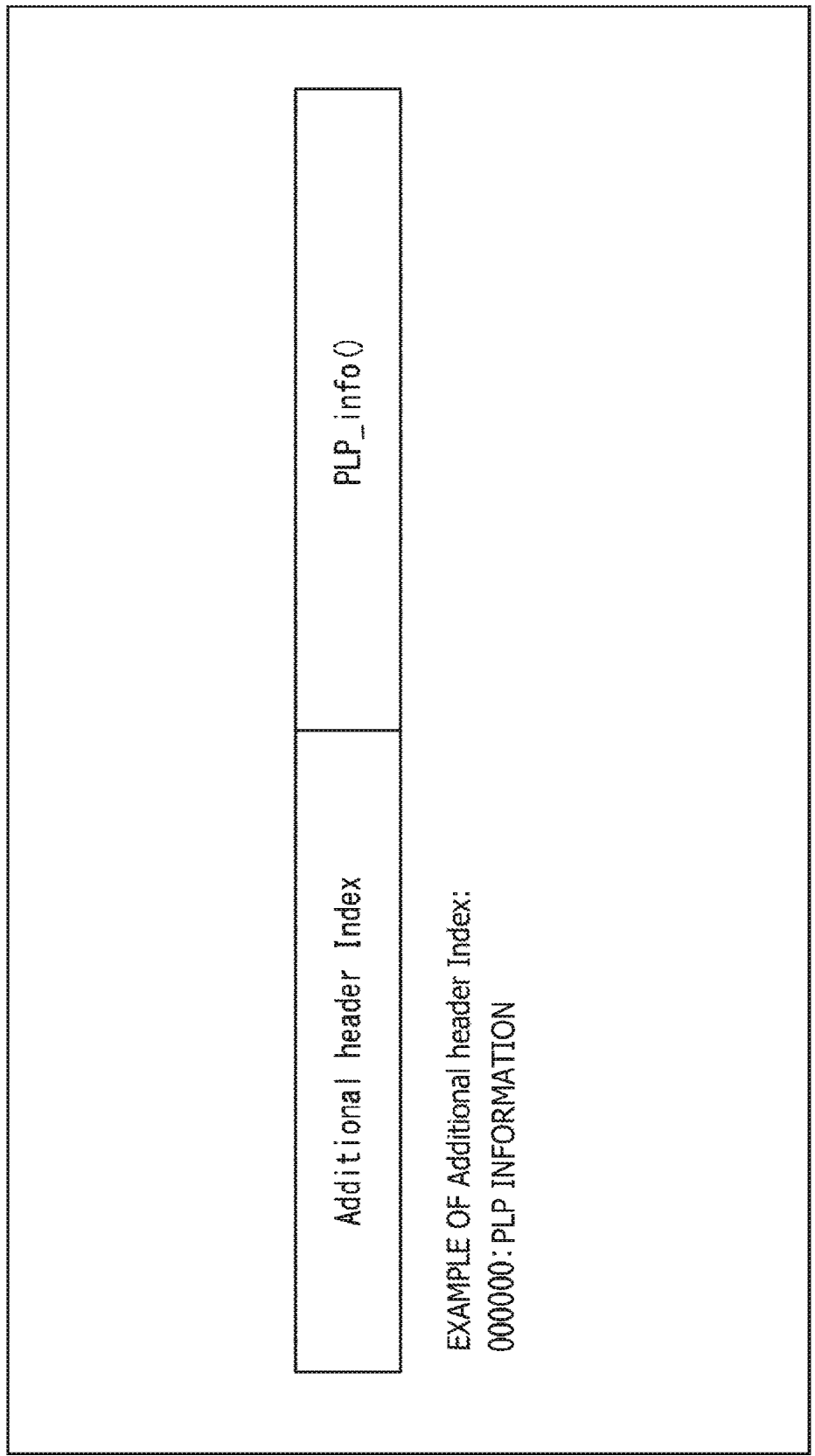
FIG. 22 is another explanatory diagram explaining the ALP extension header transmission method.

Described next with reference to FIGS. 21 and 22 is the ALP extension header transmission method. The ALP extension header transmission method involves transmitting the PLP information using the ALP extension header.

FIG. 21 depicts how the ALP packet is structured. In the ALP packet depicted in FIG. 21, the top of the ALP header is set with three-bit type information (Type). The type information is associated with the type of the data placed in the payload of the ALP packet.

In the ALP header, the type information is followed by one-bit packet configuration information (PC (Packet Configuration)). If "0" is set as the packet configuration information, single packet mode is selected in accordance with a one-bit HM (Header Mode) field that follows the PC. An 11-bit length information field (Length) and an extension header (additional header) are placed in the ALP header. Furthermore, in the ALP packet, the ALP header is followed by the payload.

Note that in single packet mode, the ALP packet without an extension header is called the normal packet. The ALP packet supplemented with the extension header is called the long packet.

On the other hand, if "1" is set as the packet configuration information (PC), either segmentation mode or concatenation mode is selected in accordance with a one-bit field "S/C" (Segmentation/Concatenation) that follows the PC. An 11-bit length information field (Length) and an extension header (additional header) are placed in the ALP header.

According to the ALP extension header transmission method, the PLP information is placed in the extension header (additional header) depicted enclosed by frame A in the figure. That is, in single packet (long packet) mode and in segmentation mode, if "1" is set as an OHF (Optional Header Extension Flag) in the extension header, then an optional header is provided. Furthermore, in concatenation mode, if "1" is set to the extension header as an SIF (Sub-Stream Identifier Flag), an optional header is provided.

In the optional header, a structure depicted in FIG. 22 may be placed. In the structure of FIG. 22, diverse information is provided for each extension header index information (additional header index). For example, if "000000" is set as the extension header index information, the PLP information (PLP_info) may be defined to be provided in the optional header. In this case, the PLP information depicted in FIG. 20 may be provided.

As described above, the PLP information is placed in the extension header of the ALP packet and transmitted using the ALP extension header transmission method as the transmission format for PLP information transmission. This allows the reception apparatus 22 (FIG. 8) to extract the PLP information included in the extension header of the ALP packet. The demultiplexer 222 in the reception apparatus 22 (FIG. 8) is thus able to identify to which PLP each IP packet input from the demodulation section 221 belongs by use of the PLP ID included in the PLP information.

(C) L2 Signaling Header Transmission Method

Figure 23:
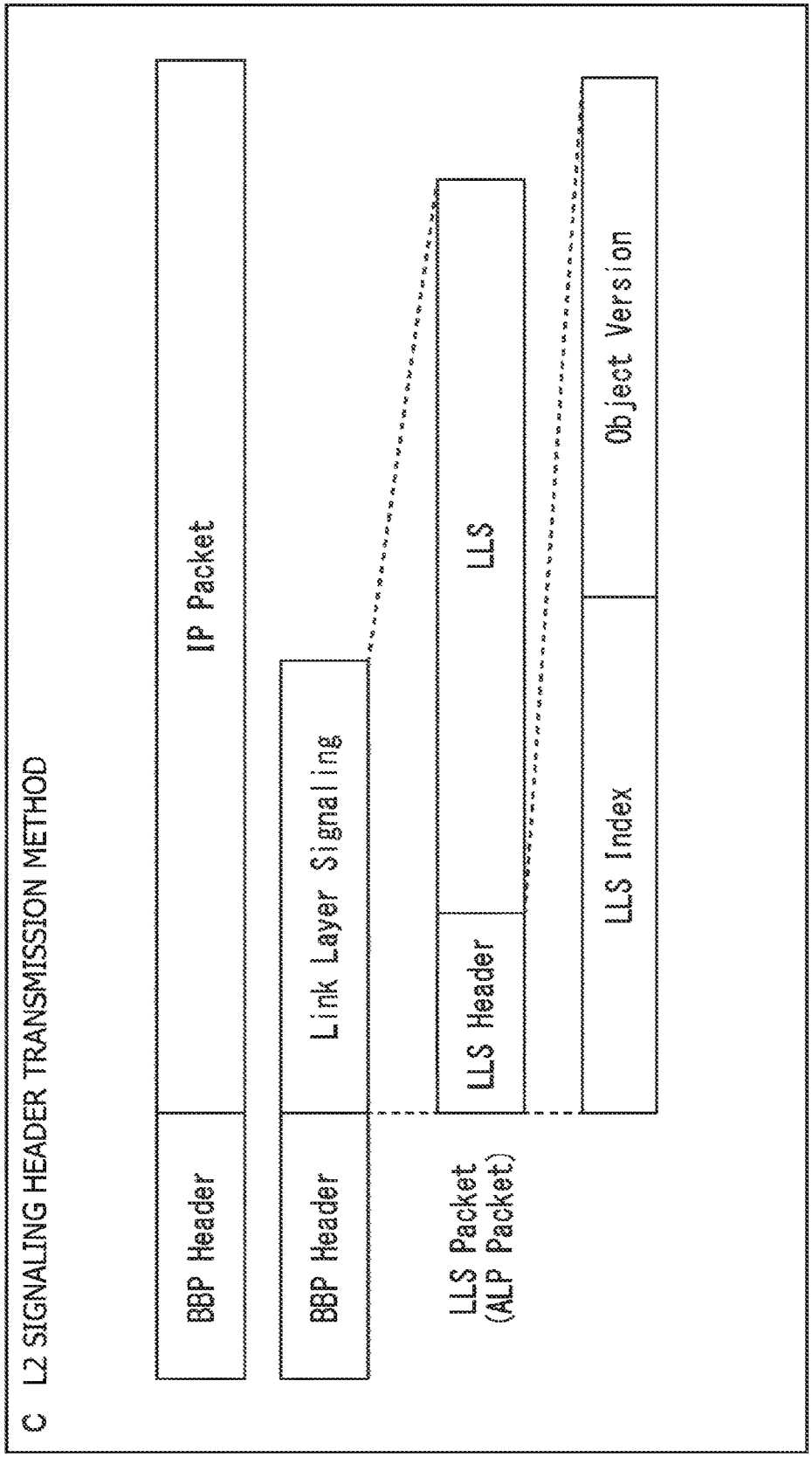
FIG. 23 is an explanatory diagram explaining an L2 signaling header transmission method.

Described next with reference to FIGS. 23 and 24 is the L2 signaling header transmission method. The L2 signaling header transmission method involves transmitting the PLP information using the header of the L2 signaling.

FIG. 23 depicts a structure of an LLS (Link Layer Signaling) packet as the ALP packet of layer 2.

In FIG. 23, an IP packet and L2 signaling are placed in the payload of the ALP packet. This example depicts that the LLS signaling is provided as the L2 signaling. The LLS signaling is acquired prior to the SLS signaling. The LLS signaling includes metadata such as the SLT, EAT, and RRT, for example.

If the LLS signaling is placed in the payload of the ALP packet, the ALP packet may be said to be an LLS packet as well. The LLS packet includes an LLS header and a payload that includes the LLS signaling (LLS). Furthermore, in this case, at least one LLS packet is placed and encapsulated into the payload of the BBP.

A structure including LLS index information (LLS Index) and object version information (Object Version) may be placed in the LLS header.

Compression information (Compression Scheme), type information (Fragment Type), and extension type information (Type Extension) are placed in the LLS index information. The compression information is set to indicate whether the LLS signaling of interest is compressed or not. For example, if "0000" is set to the compression information, that means the LLS signaling is not compressed. If "0001" is set to the compression information, that means the LLS signaling is compressed in zip format.

The type information (Fragment Type) is set with information associated with the type of LLS signaling. For example, "000000" may be set for the SLT, "000001" for the EAT, and "000010" for the RRT. In the extension type information, an extension parameter is set for each type. Furthermore, information related to the version of the object is placed in the object version information.

Furthermore, the structure placed in the LLS header may include the PLP information (PLP_info) in addition to the LLS index information and the object version information, as depicted in FIG. 24. The PLP information indicated in FIG. 20 may be placed in this structure.

As described above, the PLP information is placed into the header of the L2 signaling and transmitted using the L2 signaling header transmission method as the transmission format for PLP information transmission. This allows the reception apparatus 22 (FIG. 8) to extract the PLP information included in the header of the L2 signaling. In the reception apparatus 22 (FIG. 8), the demultiplexer 222 is thus able to identify to which PLP each IP packet input from the demodulation section 221 belongs by use of the PLP ID included in the PLP information.

(D) L2 Signaling Transmission Method

Described below with reference to FIG. 25 is the L2 signaling transmission method. The L2 signaling transmission method involves transmitting the PLP information using the body of the L2 signaling placed in the payload of the ALP packet.

In the PLP information (L2 signaling) depicted in FIG. 25, an eight-bit field "PLP_info_id" is set with an ID indicating the type of the descriptor of interest. A six-bit field "PLP_id" is set with the PLP ID identifying the PLP. Note that a two-bit field "reserved" is an undefined field.

Alternatively, the PLP information itself depicted in FIG. 25 may be placed as the L2 signaling in the payload of the ALP packet. As another alternative, the PLP information in FIG. 25 may be included in the L2 signaling (e.g., LLS signaling) placed in the payload of the ALP packet.

As described above, the PLP information is placed in the body of the L2 signaling and transmitted using the L2 signaling transmission method as the transmission format for PLP information transmission. This allows the reception apparatus 22 (FIG. 8) to extract the PLP information placed in the body of the L2 signaling. In the reception apparatus 22 (FIG. 8), the demultiplexer 222 is thus able to identify to which PLP each IP packet input from the demodulation section 221 belongs by use of the PLP ID included in the PLP information.

(E) BBP Extension Header Transmission Method

Described last with reference to FIGS. 26 to 29 is the BBP extension header transmission method. The BBP extension header transmission method involves transmitting the PLP information using the BBP extension header.

Figure 26:
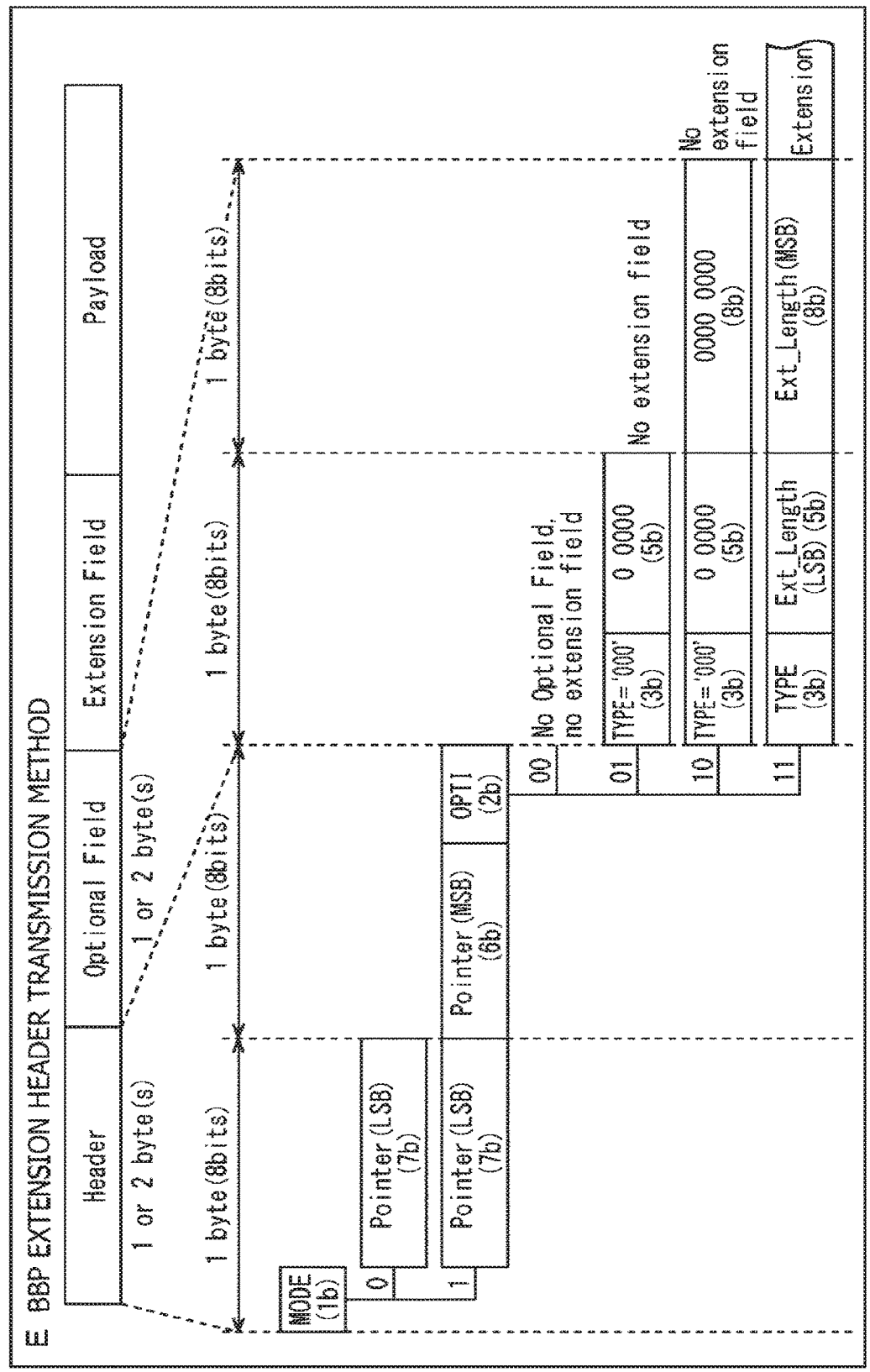
FIG. 26 is an explanatory diagram explaining a BBP extension header transmission method.

FIG. 26 depicts a structure of the BBP (Baseband Packet). In FIG. 26, the BBP includes a BBP header and a payload. In the BBP header, there may be provided an optional field and an extension field in addition to a header of one or two bytes.

That is, if "0" is set in a one-bit field (MODE) of the header, then seven-bit pointer information (Pointer (LSB)) is provided. Note that the pointer information is position information that indicates where the ALP packet is positioned in the payload of the BBP. For example, if the data of the ALP packet placed at the end of a BBP is provided astride the next BBP, then the position information associated with the ALP packet placed at the top of the next BBP may be provided as the pointer information.

Furthermore, if "1" is set in the MODE field, there are provided seven-bit pointer information (Pointer (LSB)), six-bit pointer information (Pointer (MSB)), and a two-bit optional flag (OPTI). The optional flag is information that indicates whether the header is extended by providing an optional field and/or an extension field.

Figure 27:
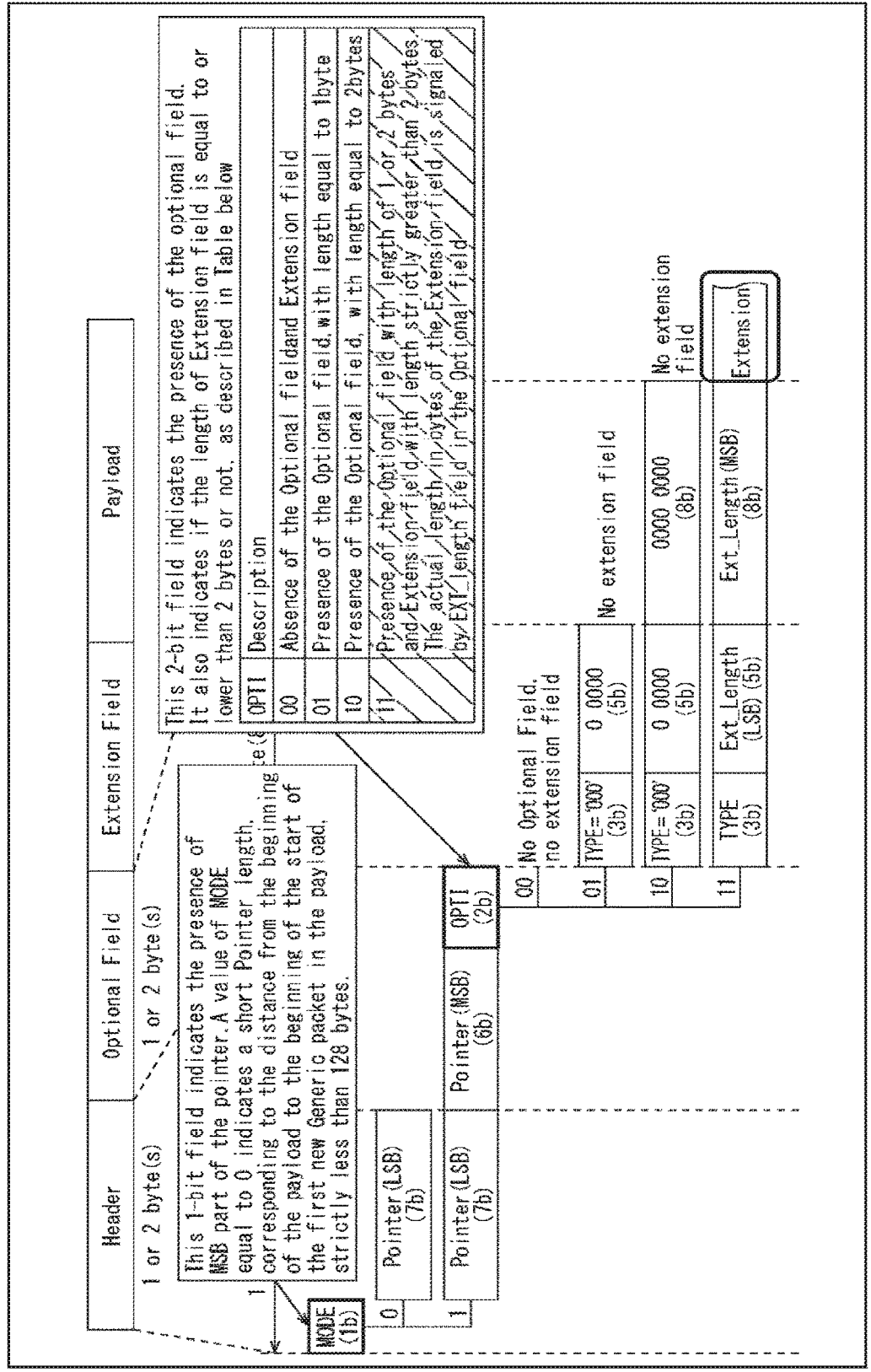
FIG. 27 is another explanatory diagram explaining the BBP extension header transmission method.

That is, as depicted in FIG. 27, if the optional field and the extension field are not provided, "00" is set to the optional flag. Furthermore, if only the optional field is provided, "01" or "10" is set to the optional flag. Note that if "01" is set to the optional flag, the optional field is padded with one byte (8 bits). Furthermore, if "10" is set to the optional flag, the optional field is padded with two bytes (16 bits).

Figure 28:
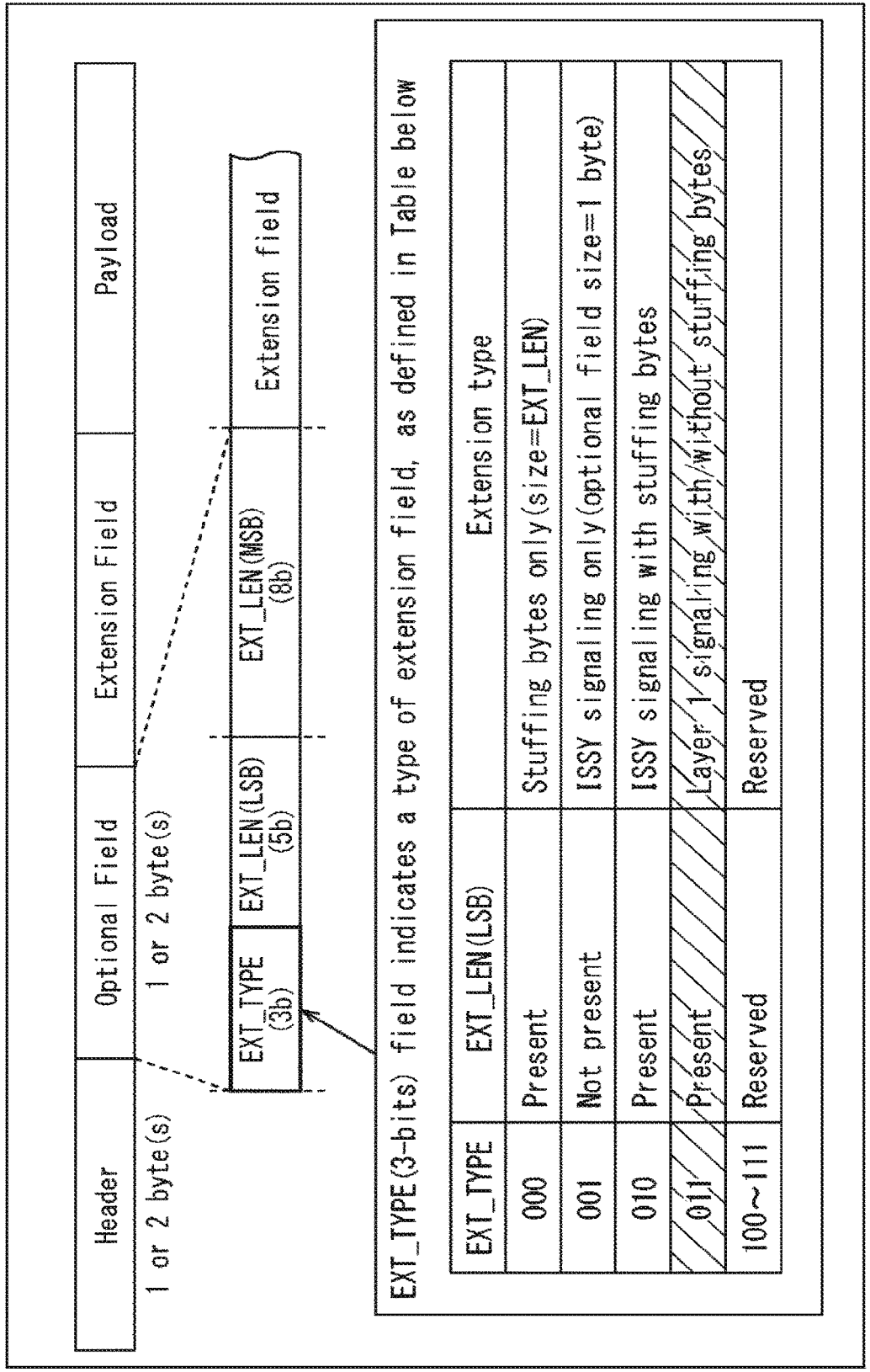
FIG. 28 is another explanatory diagram explaining the BBP extension header transmission method.

Furthermore, if the optional field and the extension field are provided, "11" is set to the optional flag. In this case, the top of the optional field is set with three-bit extension type information (TYPE (EXT_TYPE)). In this type information, extension length information (EXT_Length (LSB)) next to the extension type information and extension field type information (Extension type) are set as depicted in FIG. 28.

That is, if the extension length information is provided and if only stuffing bytes are placed, "00" is set to the extension type information. Also, if the extension length information is not provided and if an ISSY (Input Stream Synchronizer) is placed in the extension field, "001" is set to the extension type information. Further, if the extension length information is provided and if the extension field is set with ISSY as well as stuffing bytes, then "010" is set to the extension type information.

Furthermore, if the extension length information is provided and if the L1 signaling is placed in the extension field, "011" is set to the extension type information. In this case, whether to provide the stuffing bytes is optional. Note that in FIG. 28, the extension type information of "100" to "111" is not defined (reserved).

According to the BBP extension header transmission method, the PLP information is provided as the L1 signaling in the extension field (BBP extension header). That is, in a case where the BBP extension header transmission method is used, "11" is set as the optional flag (OPTI) to permit extension with the optional field and the extension field. Also, "011" is set as the extension type information (EXT_TYPE) in the optional field to provide the L1 signaling including the PLP information in the extension field.

Figure 29:
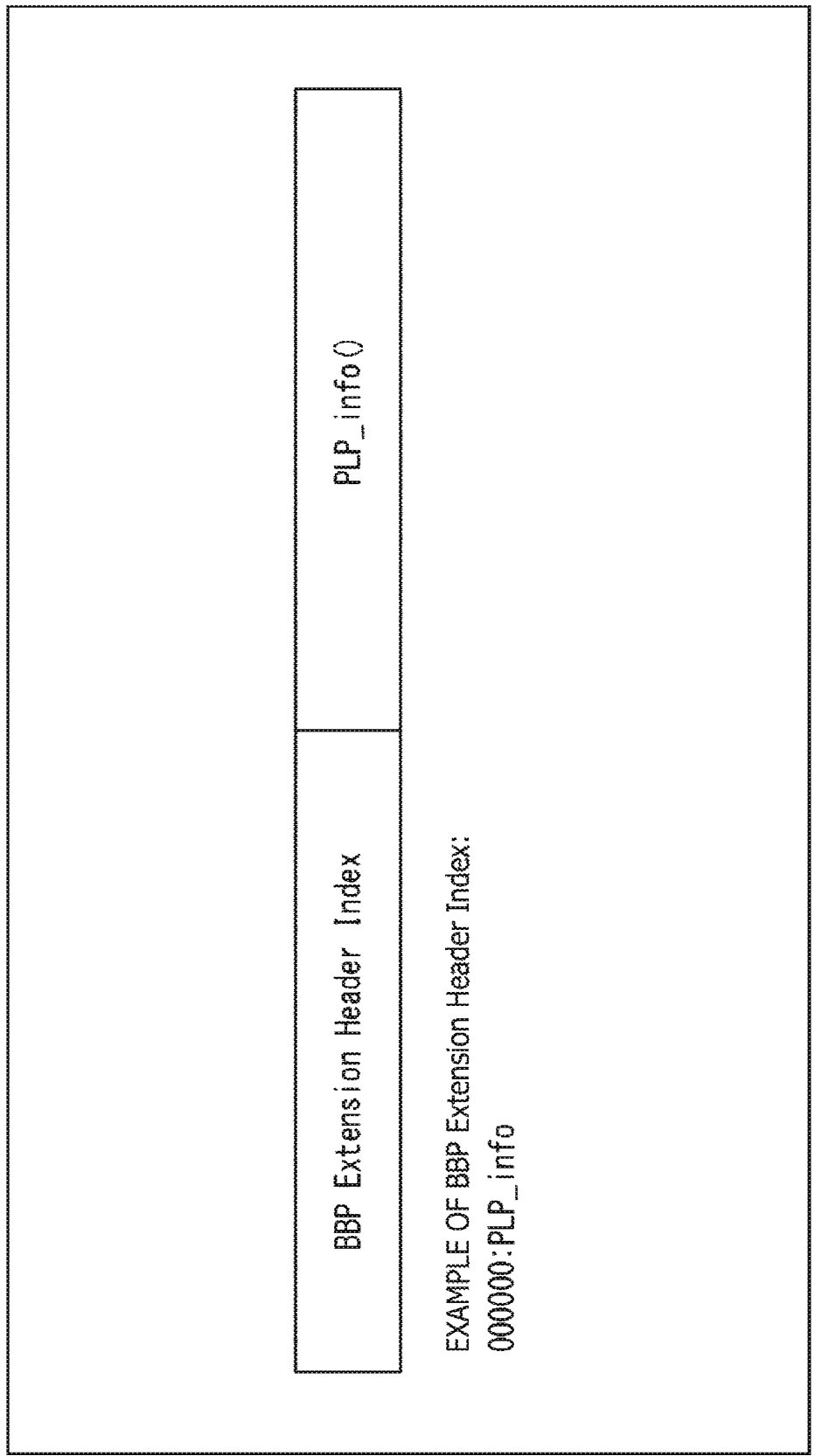
FIG. 29 is another explanatory diagram explaining the BBP extension header transmission method.

A structure depicted in FIG. 29 may be placed in the extension field. In the structure in FIG. 29, diverse information is provided for each extension header index information (BBP extension header index). If "000000" is set as the extension header index information, the extension field may be defined to be provided with the PLP information (PLP_info). In this case, the PLP information depicted in FIG. 20 may be provided.

As described above, the PLP information is placed in the BBP extension header and transmitted using the BBP extension header transmission method as the transmission format for PLP information transmission. This allows the reception apparatus 22 (FIG. 8) to extract the PLP information placed in the BBP extension header. In the reception apparatus 22 (FIG. 8), the demultiplexer 222 is thus able to identify to which PLP each IP packet input from the demodulation section 221 belongs by use of the PLP ID included in the PLP information.

<4. Measures by Other Methods>

The foregoing description has dealt with the methods of implementing a single interface for the receiving-side circuits with the ROUTE adopted as the transport protocol for the IP transmission method. Alternatively, the methods of implementing a single interface for the receiving-side circuits may be used in conjunction with other transport protocols as well.

For example, the ATSC 3.0 standard currently worked out is presumed to adopt both the ROUTE and the MMT (MPEG Media Transport) as the transport protocol. The MIT is a transport method used over the IP (Internet Protocol). The MIT method involves referencing video and audio data by setting IP addresses and URLs using control information.

The ensuing paragraphs describe cases where the above-described methods of implementing a single interface for the receiving-side circuits are applied to the MMT method. Furthermore, because it is also possible to apply to the MPEG2-TS method the above-described methods of implementing a single interface for the receiving-side circuits, some of these cases will also be explained.

(1) MMT Method
(System Pipe Model)

Figure 30:
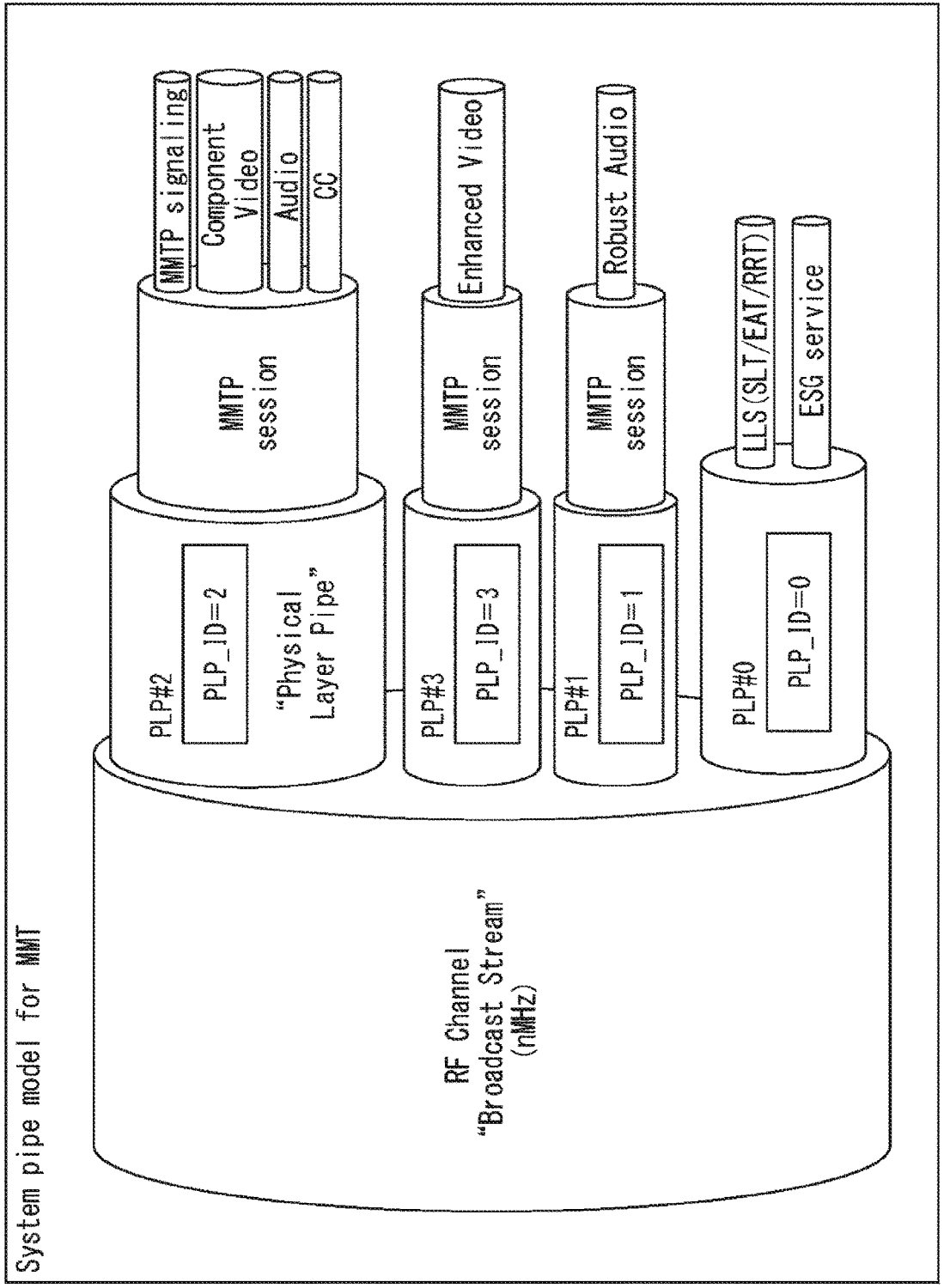
FIG. 30 is a schematic diagram depicting a typical system pipe model of an MMT method.

FIG. 30 is a schematic diagram depicting a typical system pipe model of the MMT method.

The system pipe model of the MMT method in FIG. 30 is basically similar to the system pipe model of the above-described ROUTE method (FIG. 4) except that the MMT (MMTP) is used instead of the ROUTE as the transport protocol.

That is, video and audio components and streams such as signaling are transmitted not in the ROUTE session but in the MMTP session. It is to be noted that in the MMTP session of PLP #2, MMTP signaling is transmitted in place of the SLS signaling.

(IP Data Flow)

Figure 31:
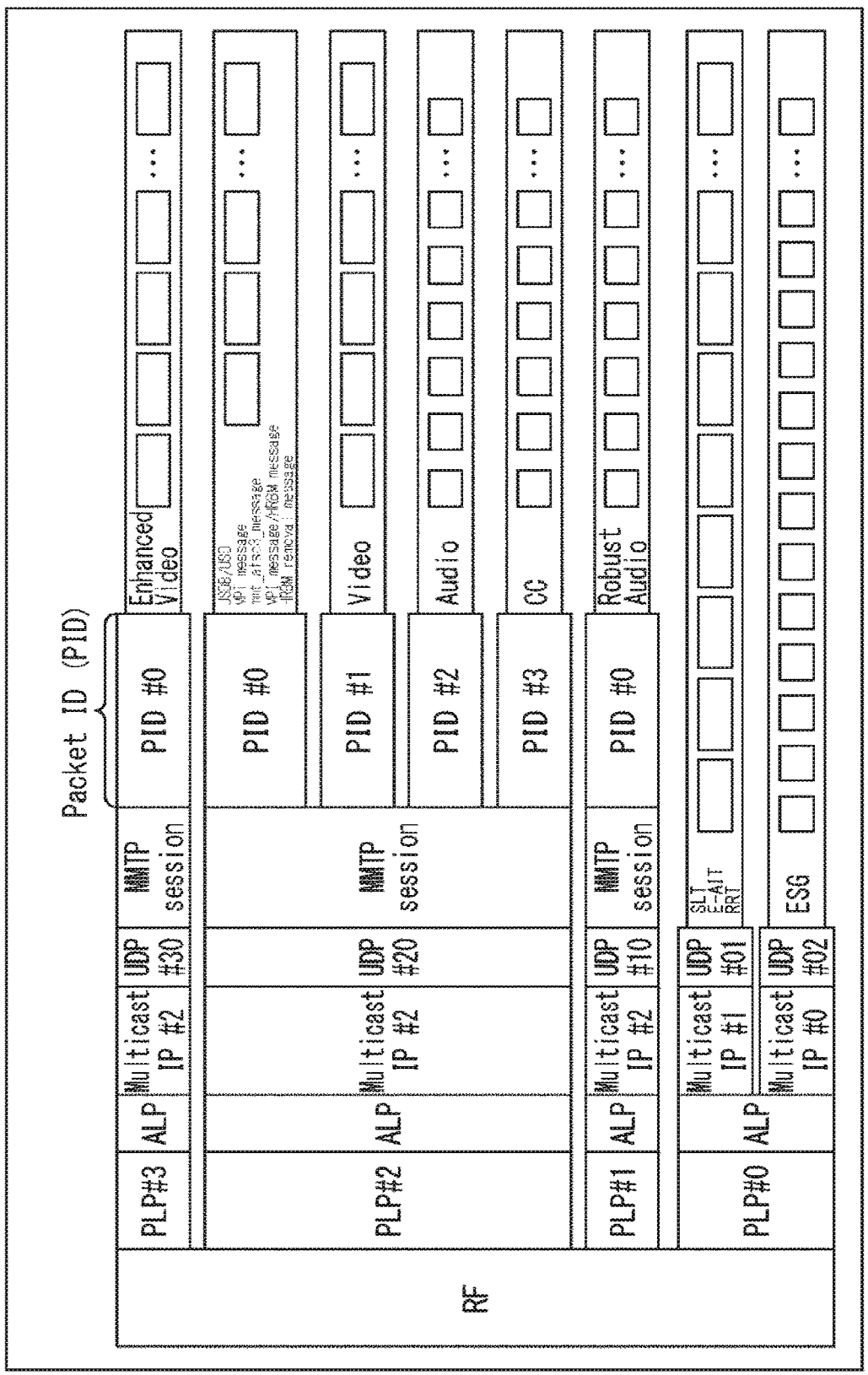
FIG. 31 is a schematic diagram depicting an IP data flow of the MMT method.

FIG. 31 is a schematic diagram depicting an IP data flow of the MMT method.

The IP data flow of the MMT method in FIG. 31 is basically similar to the IP data flow of the above-described ROUTE method (e.g., in FIGS. 5 and 11) except that the MIT is used instead of the ROUTE as the transport protocol.

That is, video and audio components and streams such as signaling are transmitted not in the ROUTE session but in the MMTP session. It is to be noted that the ROUTE session is controlled using the TSI (Transport Session ID) whereas the MMTP session is controlled using the PID (Packet ID). Furthermore, in the MMTP session of PLP #2, MMTP signaling is transmitted in place of the SLS signaling.

Where the MMT method is used, as in a case where the above-described ROUTE method is in use, the demodulation section configured as an RF IC or demodulation LSI and the demultiplexer configured as a system-on-chip (SoC) may be interconnected via a single interface (I/F) in the reception apparatus using the IP data flow identification method or the information addition method. In this case, in the reception apparatus, the IP stream output from the demodulation section is input to the demultiplexer via the single interface (I/F).

Note that as indicated in the above-described FIG. 9, the IP data flow identification methods include the transmitting-side IP data flow identification method and the receiving-side IP data flow method; and the information addition methods include the transmitting-side information addition method, the receiving-side information addition method 1, and the receiving-side information addition method 2.

(2) MPEG2-TS Method
(System Pipe Model)

Figure 32:
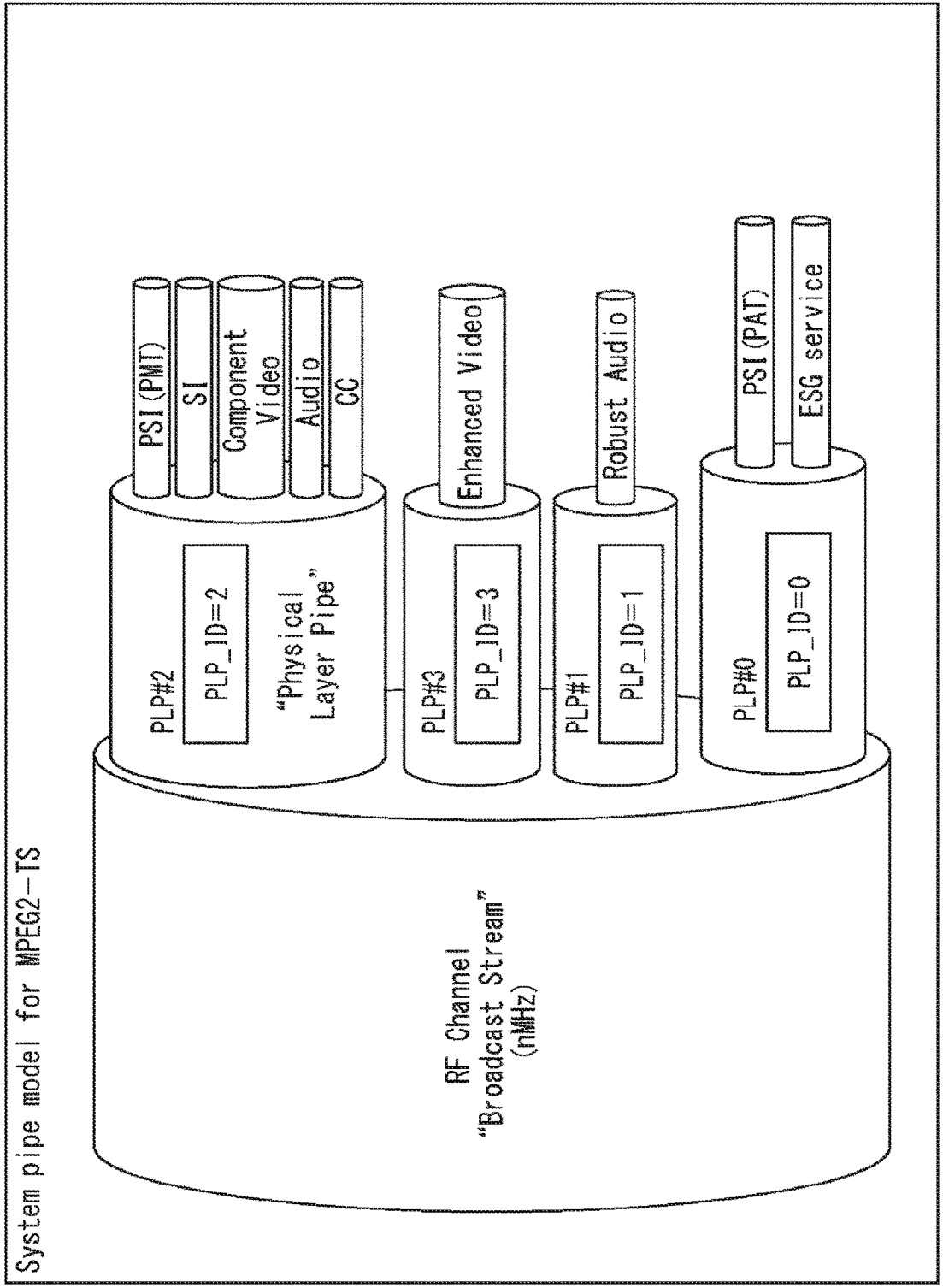
FIG. 32 is a schematic diagram depicting a typical system pipe model of the MPEG2-TS method.

FIG. 32 is a schematic diagram depicting a typical system pipe model of the MPEG2-TS method.

The system pipe model of the MPEG2-TS method in FIG. 32 is different from the system pipe model discussed earlier (in FIG. 4) in that video and audio components and streams such as signaling are not transmitted in the ROUTE session.

Also, in the system pipe model of the MPEG2-TS method in FIG. 32, PLP #0 includes a PAT (Program Association Table) as PSI (Program Specific Information) in place of the LLS signaling. Furthermore, PLP #2 includes a PMT (Program Map Table) and SI (Service Information) as the PSI in place of the SLS signaling.

(TS Data Flow)

Figure 33:
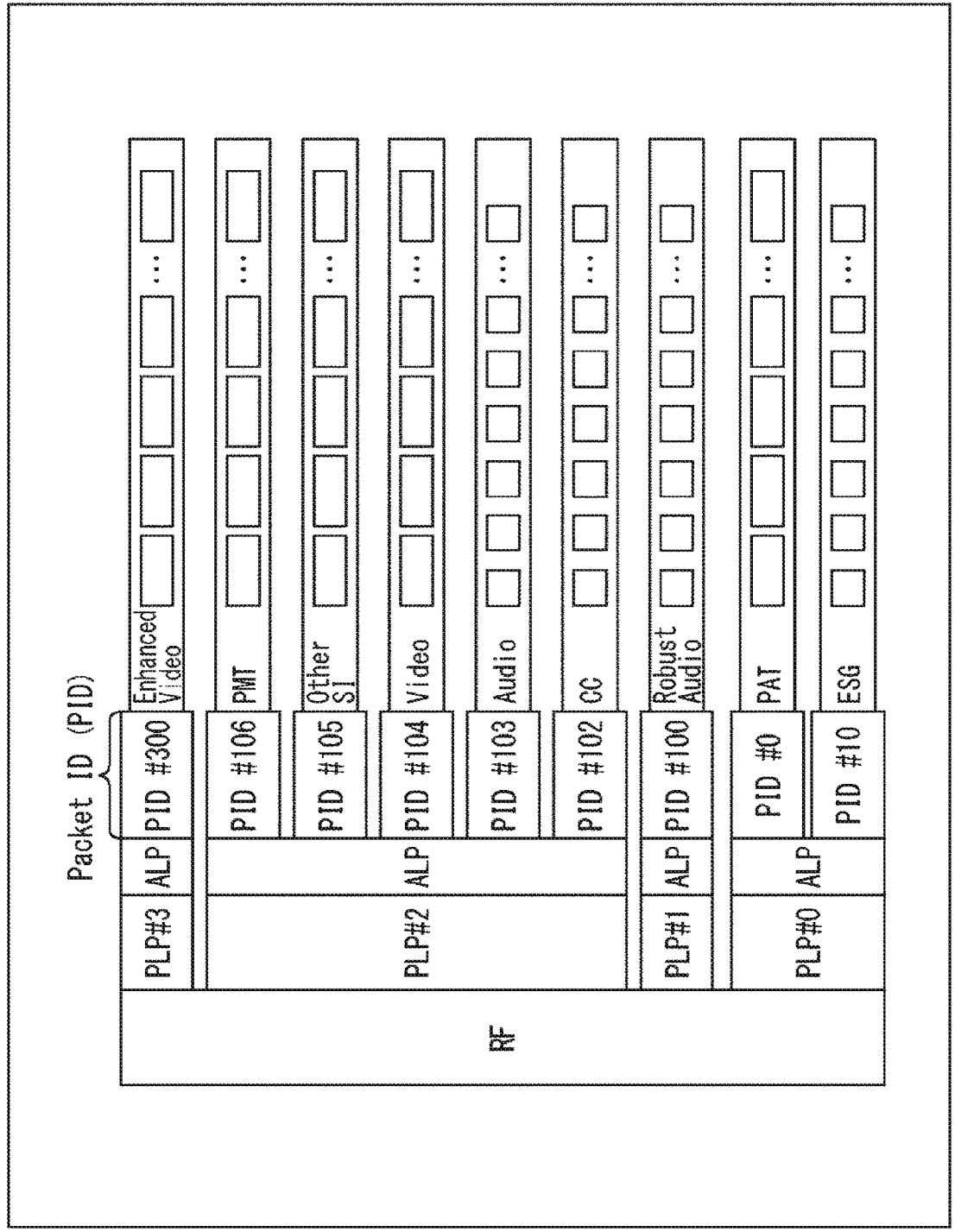
FIG. 33 is a schematic diagram depicting a TS data flow of the MPEG2-TS method.

FIG. 33 is a schematic diagram depicting a TS data flow of the MPEG2-TS method.

The TS data flow of the MPEG2-TS method in FIG. 33 is different from the IP data flow of the above-described ROUTE method (e.g., in FIGS. 5 and 11) in that the IP packet and the ROUTE session are not used. Furthermore, in the TS data flow of the MPEG2-TS method, video and audio components and such data as the signaling are encapsulated into the ALP packet. It is to be noted that each ALP packet is identified using a PID (Packet ID).

Where the MPEG2-TS method is used, as in a case where the above-described ROUTE method is in use, the demodulation section configured as an RF IC or demodulation LSI and the demultiplexer configured as a system-on-chip (SoC) may be interconnected via a single interface (I/F) in the reception apparatus using the IP data flow identification method (TS data flow identification method) or the information addition method. In this case, in the reception apparatus, the transport stream (TS) output from the demodulation section is input to the demultiplexer via the single interface (I/F).

The MPEG2-TS method does not use the IP packet including the UDP packet. For this reason, in a case where the IP data flow identification method (TS data flow identification method) is adopted, each PID may be similarly allocated a unique value instead of the IP address and the port number being allocated unique values. Furthermore, with the MPEG2-TS method, it is also possible to implement the above-described information addition method by adding the PLP information to the extension header of a packet, for example.

Note that as indicated in the above-described FIG. 9, the IP data flow identification methods (TS data flow identification methods) include the transmitting-side IP data flow identification method (transmitting-side TS data flow identification method) and the receiving-side IP data flow method (receiving-side TS data flow identification method); and the information addition methods include the transmitting-side information addition method, the receiving-side information addition method 1, and the receiving-side information addition method 2.

<5. Flows of Processing Performed by Apparatuses>

Figure 34:
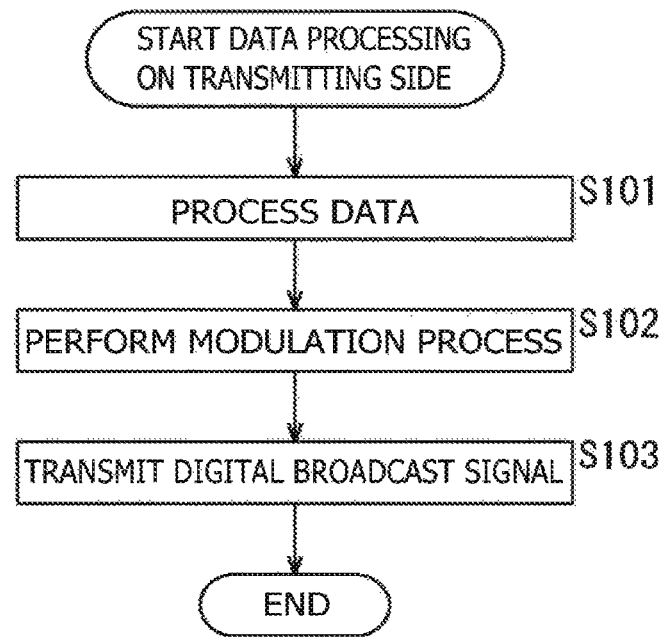
FIG. 34 is a flowchart explaining the flow of data processing on the transmitting side.
Figure 35:
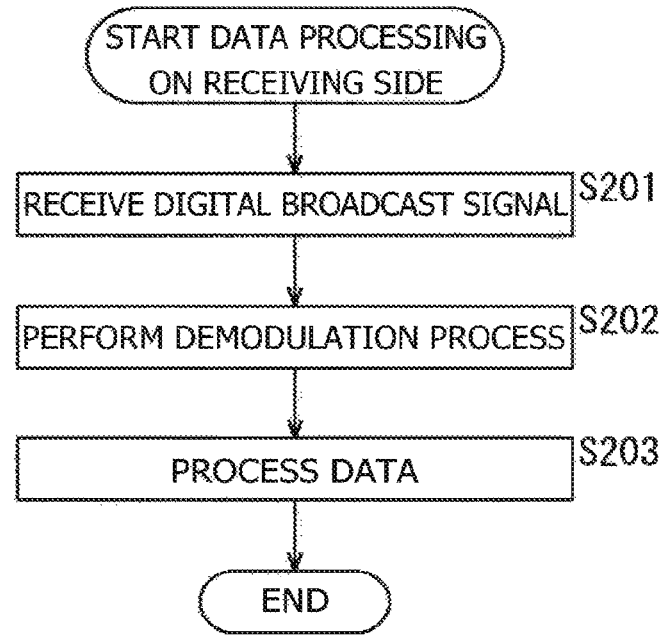
FIG. 35 is a flowchart explaining the flow of data processing on the receiving side.

Described below with reference to the flowcharts of FIGS. 34 and 35 is the flow of data processing performed by the transmission apparatus 12 and the reception apparatus 22 making up the IP transmission system 3 in FIG. 8.

(Data Processing on Transmitting Side)

Described below with reference to the flowchart of FIG. 34 is the flow of data processing on the transmitting side performed by the transmission apparatus 12 in FIG. 8.

In step S101, the multiplexer 121 and other circuits process data.

In this data process, the multiplexer 121 processes multiple input IP streams (IPs). It is to be noted that according to the ATSC 3.0 standard, up to 64 IP streams are input on a given frequency band corresponding to the PLPs.

Where the transmitting-side IP data flow identification method is adopted, the multiplexer 121 or a processing section upstream thereof (not depicted), for example, allocates the IP address and the port number of a given IP data flow in such a manner that their values are unique throughout a service.

Furthermore, in a case where the transmitting-side information addition method is adopted, the multiplexer 121 or a processing section upstream thereof (not depicted) may perform the process of including the PLP information together with the PLP ID into the extension header of a packet (e.g., ALP packet) depending on the PLP information transmission method.

In step S102, the modulation section 122 performs a modulation process on the data processed in step S101.

In this modulation process, the processes related to the physical layer (PHY) such as an error correction encoding process (e.g., BCH encoding or LDPC encoding) and a modulation process (e.g., OFDM modulation) are carried out on multiple IP streams (IPs).

At this point, with the transmitting-side information addition method adopted, the modulation section 122 may perform processes such as that of including the PLP information together with the PLP ID into the extension header of a packet (e.g., BBP extension header) depending on the PLP information transmission method.

In step S103, the process of transmitting a digital broadcast signal is performed.

In this process of digital broadcast signal transmission, the signal processed in step S102 is transmitted as the digital broadcast signal via an antenna.

What was discussed above is the flow of transmitting-side data processing.

(Data Processing on Receiving Side)

Described next with reference to the flowchart of FIG. 35 is the flow of data processing on the receiving side performed by the reception apparatus 22 in FIG. 8.

In step S201, the process of receiving a digital broadcast signal is performed.

In this process of digital broadcast signal reception, the digital broadcast signal transmitted through the transmission path 32 from the transmission apparatus 12 (FIG. 8) is received via an antenna.

In step S202, the demodulation section 221 performs a demodulation process.

This demodulation process involves carrying out on the input signal a demodulation process (e.g., OFDM demodulation) and an error correction decoding process (e.g., LDPC decoding or BCH decoding), as well as processes related to packets such as the IP packets.

At this point, with the receiving-side IP data flow method adopted, the demodulation section 221 performs the process of reallocating the IP address and the port number of the IP data flow in such a manner that their values are in a unique combination.

Furthermore, in a case where the receiving-side information addition method 1 is adopted, the demodulation section 221 includes the PLP information into the extension header of the ALP packet, IP packet, or BBP (Baseband Packet) so that the PLP information will be added inside these packets. Furthermore, in a case where the receiving-side information addition method 2 is adopted, the demodulation section 221 encapsulates the PLP information into the ALP packet, IP packet, or BBP so that the PLP information may be added outside these packets.

In step S203, the demultiplexer 222 or other suitable circuits process data.

In this data process, the IP streams (IPs) obtained in step S202 are processed. For example, the IP stream corresponding to the selected broadcast program is output to downstream circuits. The downstream circuits may perform such processes as that of decoding the video and audio data included in the IP stream so as to reproduce the selected broadcast program (content).

Note that as discussed above, the demodulation section 221 performing step S202 (e.g., RF IC or demodulation LSI) and the demultiplexer 222 carrying out step S203 (e.g., system-on-chip (SoC)) are configured as two different chips. These chips are interconnected via a single interface (I/F) using the above-mentioned IP data flow identification method or information addition method.

In the reception apparatus 22 in FIG. 8, the IP stream (IP) output from the demodulation section 221 is input to the demultiplexer 222 via the single interface (I/F).

What was discussed above is the flow of receiving-side data processing.

<6. Variations>

Although the present technology was described above as applicable to the ATSC (ATSC 3.0 in particular) adopted in the United States and elsewhere as the digital broadcast standards, this technology also applies to the ISDB (Integrated Services Digital Broadcasting) adopted by Japan and others as well as to the DVB (Digital Video Broadcasting) adopted by European countries. Furthermore, as the digital broadcast, it is possible to adopt not only terrestrial broadcasting but also satellite broadcasting that uses BS (Broadcasting Satellites) or CS (Communications Satellites) or community antenna television (CATV) that uses cables.

Furthermore, explained above as the IP transmission system 3 in FIG. 8 is a typical configuration in which the transmission apparatus 10 alone of the broadcasting station includes both the multiplexer 121 and the modulation section 122. In a common digital broadcasting system, however, the multiplexer 121 and the modulation section 122 are installed at different locations. For example, the multiplexer 121 is installed in a broadcasting station while the modulation section 122 is set up at a transmitting station. Any of the above-described methods of implementing a single interface for the receiving-side circuits may be used to implement the interface (I/F) between the multiplexer 121 in the broadcasting station and the modulation section 122 at the transmitting station. That is, the methods may be used as a transmission format for forwarding multiple IP streams created by the broadcasting station to the transmitting station via a single transmission path.

Furthermore, the above-mentioned names of the signaling and packets are examples and may be replaced with other names. It is to be noted, however, that these names differ only in form and that the signaling or the packet of interest does not differ from the otherwise-named corresponding signaling or packet in substance. For example, the BBP (Baseband Packet) may also be called the BBS (Baseband Stream). Furthermore, the ESG (Electronic Service Guide) may also be called the EPG (Electronic Program Guide). Note that the above-mentioned content includes not only videos and pieces of music but also electronic books, video games, advertisements, and any other forms of content.

Furthermore, the present technology may be used in conjunction with standards (other than the digital broadcast standards) stipulated on the assumption that communication lines (communication networks) such as the Internet or telephone networks are used as the transmission paths other than those of broadcasting networks. In such cases, the communication lines such as the Internet or telephone networks are used as the transmission path 32 for the IP transmission system 3 (FIG. 8), with the transmission apparatus 12 being a server on the Internet. The reception apparatus 22 is arranged to have communication capabilities, with the transmission apparatus 12 performing processes to deal with requests from the reception apparatus 22. Furthermore, the reception apparatus 22 then processes data transmitted via the transmission path 32 (communication lines) from the transmission apparatus 12 (server).

<7. Configuration of Computer>

Figure 36:
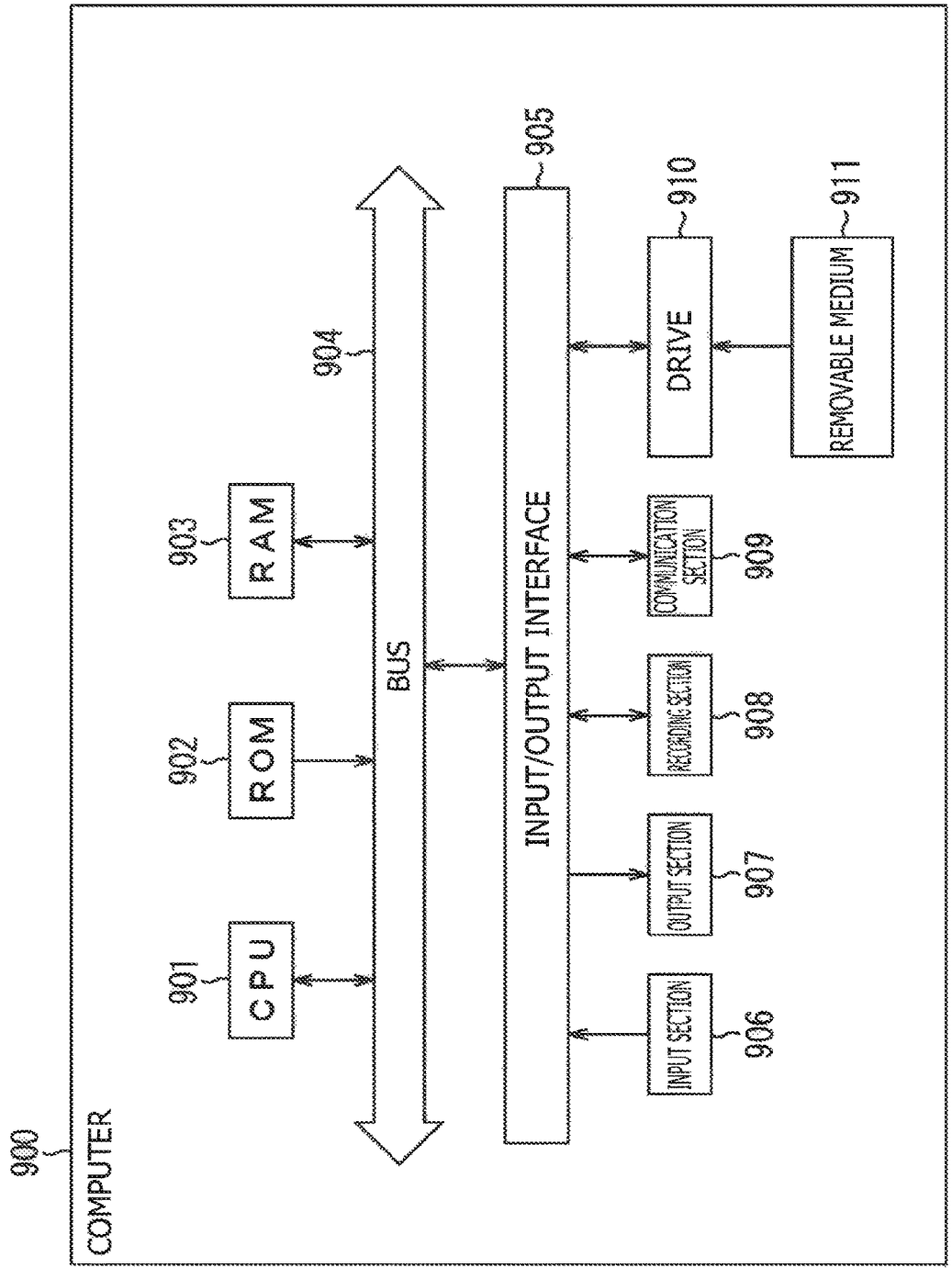
FIG. 36 is a block diagram depicting a typical configuration of a computer.

The series of processing described above may be executed either by hardware or by software. Where a software-based series of processing is to be carried out, the programs constituting the software are installed into a suitable computer. FIG. 36 is a schematic diagram depicting a typical hardware configuration of a computer that executes the above-described series of processing using programs.

In a computer 900, a CPU (Central Processing Unit) 901, a ROM (Read Only Memory) 902, and a RAM (Random Access Memory) 903 are interconnected via a bus 904. The bus 904 is further connected with an input/output interface 905. The input/output interface 905 is connected with an input section 906, an output section 907, a recording section 908, a communication section 909, and a drive 910.

The input section 906 includes a keyboard, a mouse, and a microphone, for example. The output section 907 includes a display unit and speakers, for example. The recording section 908 is typically formed by a hard disk or a nonvolatile memory. The communication section 909 is typically constituted by a network interface. The drive 910 drives a removable medium 911 such as a magnetic disk, an optical disk, a magneto-optical disk, or a semiconductor memory.

In the computer 900 configured as described above, the CPU 901 performs the above-mentioned series of processing by loading appropriate programs from the ROM 902 or from the recording section 908 into the RAM 903 via the input/output interface 905 and the bus 904 and by executing the loaded programs.

The programs to be executed by the computer 900 (CPU 901) may be recorded on the removable medium 911 such as a packaged medium when offered. The programs may also be offered via a wired or wireless transmission medium such as local area networks, the Internet, and digital satellite broadcasting.

In the computer 900, the programs may be installed into the recording section 908 from the removable medium 911 attached to the drive 910 via the input/output interface 905. The programs may also be installed into the recording section 908 after being received by the communication section 909 via a wired or wireless transmission medium. The programs may alternatively be preinstalled in the ROM 902 or in the recording section 908.

In this specification, the processes executed by the computer in accordance with programs need not be carried out chronologically as depicted in the flowcharts. That is, the processes performed by the computer according to programs may include those that are conducted parallelly or individually (e.g., parallel processes or object-oriented processes). Furthermore, the programs may be processed by a single computer (processor) or by multiple computers on a shared basis.

It should be noted that the present technology when embodied is not limited to the above-described embodiments and that various modifications, variations and alternatives may be made for the technology so far as they are within the scope of the appended claims or the equivalents thereof.

Furthermore, the present technology, when implemented, may be configured preferably as follows:

(1)

A reception apparatus including:

a demodulation section configured to demodulate a packet included in each of multiple physical layer pipes (PLPs) of a broadcast stream; and a processing section configured to process the packet demodulated by the demodulation section, the demodulation section and the processing section being interconnected via a single interface, the processing section identifying the PLP to which the packet input via the single interface from the demodulation section belongs on the basis of information for identifying the PLP to which the packet belongs.

(2)

The reception apparatus as stated in paragraph (1) above, in which the broadcast stream supports an IP (Internet Protocol) transmission method, an IP address and a port number of an IP packet including a UDP (User Datagram Protocol) packet included in each PLP have values in a unique combination for each PLP, and the processing section identifies the PLP to which the packet input via the single interface from the demodulation section belongs on the basis of the combination of the IP address and the port number.

(3)

The reception apparatus as stated in paragraph (2) above, in which, in the broadcast stream transmitted from a transmission apparatus, the IP address and the port number of the IP packet are allocated values in a unique combination for each PLP.

(4)

The reception apparatus as stated in paragraph (2) above, in which the demodulation section reallocates at least either the IP address or the port number in such a manner that the IP address and the port number of the IP packet have values in a unique combination for each PLP.

(5)

The reception apparatus as stated in paragraph (1) above, in which the broadcast stream supports an IP transmission method, PLP information including information for identifying each PLP is added to data included in each PLP, and the processing section identifies the PLP to which the packet input via the single interface from the demodulation section belongs using the PLP information.

(6)

The reception apparatus as stated in paragraph (5) above, in which, in the broadcast stream transmitted from a transmission apparatus, the PLP information is added to data included in each PLP.

(7)

The reception apparatus as stated in paragraph (5) or (6) above, in which the PLP information is added to a descriptor included in an IP packet including a UDP packet, to an extension header of a first transmission packet for transmitting the IP packet, to an extension header of a second transmission packet for transmitting the first transmission packet, to signaling included in the first transmission packet, or to a header of the signaling.

(8)

The reception apparatus as stated in paragraph (5) above, in which the demodulation section adds the PLP information inside a specific packet included in each PLP.

(9)

The reception apparatus as stated in paragraph (8) above, in which the specific packet is an IP packet including a UDP packet, a first transmission packet for transmitting the IP packet, or a second transmission packet for transmitting the first transmission packet.

(10)

The reception apparatus as stated in paragraph (5) above, in which the demodulation section adds the PLP information outside a specific packet included in each PLP.

(11)
The reception apparatus as stated in paragraph (10) above, in which the specific packet is an IP packet including a UDP packet, a first transmission packet for transmitting the IP packet, or a second transmission packet for transmitting the first transmission packet.

(12)
A data processing method for a reception apparatus that includes
a demodulation section configured to demodulate a packet included in each of multiple PLPs of a broadcast stream, and
a processing section configured to process the packet demodulated by the demodulation section,
the demodulation section and the processing section being interconnected via a single interface,
the data processing method including the step of:
causing the processing section to identify the PLP to which the packet input via the single interface from the demodulation section belongs on the basis of information for identifying the PLP to which the packet belongs.

(13)
A transmission apparatus including:
a processing section configured to process a packet included in each of multiple PLPs of a broadcast stream; and
a modulation section configured to modulate the packet to be processed by the processing section,
the broadcast stream including information for identifying the PLP to which the packet belongs.

(14)
The transmission apparatus as stated in paragraph (13) above, in which
the broadcast stream supports an IP transmission method, and
the processing section allocates, in the broadcast stream, an IP address and a port number of an IP packet including a UDP packet for each PLP in such a manner that the IP address and the port number have values in a unique combination.

(15)
The transmission apparatus as stated in paragraph (13) above, in which
the broadcast stream supports an IP transmission method, and
the processing section or the modulation section adds PLP information including information for identifying each PLP to data included in each PLP.

(16)
The transmission apparatus as stated in paragraph (15) above, in which the PLP information is added to a descriptor included in an IP packet including a UDP packet, to an extension header of a first transmission packet for transmitting the IP packet, to an extension header of a second transmission packet for transmitting the first transmission packet, to signaling included in the first transmission packet, or to a header of the signaling.

(17)
A data processing method for a transmission apparatus, including the steps of:
causing the transmission apparatus to process a packet included in each of multiple PLPs of a broadcast stream; and
causing the transmission apparatus to modulate the packet to be processed by the processing section,
the broadcast stream including information for identifying the PLP to which the packet belongs.

REFERENCE SIGNS LIST

3 IP transmission system, 12 Transmission apparatus, 22 Reception apparatus, 32 Transmission path, 121 Multiplexer, 122 Modulation section, 221 Demodulation section, 222 Demultiplexer, 261 Demodulation multiplexer, 262 IP demultiplexer, 263 BBP demultiplexer, 900 Computer, 901 CPU

The invention claimed is:

1. A reception apparatus, comprising:
demodulation circuitry configured to obtain packets included in a plurality of PLPs (Physical Layer Pipes) of a broadcast stream; and
processing circuitry configured to process the packets obtained by the demodulation circuitry,
the demodulation circuitry and the processing circuitry being interconnected via a single interface,
wherein
the broadcast stream supports an IP (Internet Protocol) transmission method,
each combination of an IP address and a port number of an IP packet or a UDP (User Datagram Protocol) packet included in the plurality of PLPs is unique for each PLP in which the corresponding IP packet or the corresponding UDP packet is included, and
the processing circuitry is configured to identify a PLP of the plurality of PLPs in which one of the packets input via the single interface from the demodulation circuitry is included according to the combination of the IP address and the port number of the one of the packets.

2. The reception apparatus according to claim 1, wherein the demodulation circuitry is further configured to perform reallocation of the IF address or the port number of the one of the packets in such a manner that the combination of the IP address and the port number of the one of the packets after the reallocation is unique for the PLP of the plurality of PLPs in which the one of the packets is included.

3. A reception apparatus, comprising:
demodulation circuitry configured to obtain packets included in a plurality of PLPs (Physical Layer Pipes) of a broadcast stream; and
processing circuitry configured to process the packets obtained by the demodulation circuitry,
the demodulation circuitry and the processing circuitry being interconnected via a single interface,
wherein
the broadcast stream supports an IP (Internet Protocol) transmission method,
PLP information including information for identifying each PLP of the plurality of PLPs is added to data included in the corresponding PLP of the plurality of PLPs, and
the processing circuitry is configured to identify a PLP of the plurality of PLPs in which one of the packets input via the single interface from the demodulation circuitry is included according to the PLP information.

4. The reception apparatus according to claim 3, wherein the PLP information is added to a descriptor included in an IP packet or a UDP (User Datagram Protocol) packet in the corresponding PLP, to an extension header of a first transmission packet in the corresponding PLP for transmitting the IP packet, to an extension header of a second transmission packet in the corresponding PLP for transmitting the first transmission packet, to signaling data included in the first transmission packet, or to a header of the signaling data.

5. The reception apparatus according to claim 3, wherein the demodulation circuitry is configured to add the PLP information inside a specific packet included in the corresponding PLP.

6. The reception apparatus according to claim 5, wherein the specific packet is an IP packet or a UDP packet, a first transmission packet for transmitting the IP packet, or a second transmission packet for transmitting the first transmission packet.

7. The reception apparatus according to claim 3, wherein the demodulation circuitry is configured to add the PLP information outside a specific packet included in the corresponding PLP.

8. The reception apparatus according to claim 7, wherein the specific packet is an IP packet or a UDP packet, a first transmission packet for transmitting the IP packet, or a second transmission packet for transmitting the first transmission packet.

9. A data processing method for a reception apparatus, the method comprises:
 obtaining, by demodulation circuitry of the reception apparatus, packets included in a plurality of PLPs (Physical Layer Pipes) of a broadcast stream; and
 processing, by processing circuitry of the reception apparatus, the packets obtained by the demodulation circuitry,
 the demodulation circuitry and the processing circuitry being interconnected via a single interface,
 wherein
 the broadcast stream supports an IP (Internet Protocol) transmission method,
 each combination of an IP address and a port number of an IP packet or a UDP (User Datagram Protocol) packet included in the plurality of PLPs is unique for each PLP in Which the corresponding IP packet or the corresponding UDP packet is included, and
 the data processing method further comprises:
  identifying by the processing circuitry, a PLP of the plurality of PLPs in which one of the packets input via the single interface from the demodulation circuitry is included according to the IP address and the port number of the one of the packets.

10. A transmission apparatus, comprising:
 processing circuitry configured to
  generate packets to be included in a plurality of PLPs (Physical Layer Pipes) of a broadcast stream that supports an IP (Internet Protocol) transmission method,
  allocate IP addresses and port numbers of IP packets or UDP (User Datagram Protocol) packets included in the plurality of PLPs, such that each combination of an IP address and a port number of an IP packet or a UDP packet included in the plurality of PLPs is unique for each PLP in which the corresponding IP packet or the corresponding UDP packet is included, and
  include information regarding the IP addresses and the port numbers in the respective IP packets or the respective UDP packets; and
 modulation circuitry configured to generate the broadcast stream for transmission according to the packets generated by the processing circuitry.

11. A transmission apparatus, comprising:
 processing circuitry configured to
  generate packets to be included in a plurality of PLPs (Physical Layer Pipes) of a broadcast stream that supports an IP (Internet Protocol) transmission method, and
  add PLP information, including information for identifying each PLP of the plurality of PLPs, to at least a portion of the packets included in the corresponding PLP of the plurality of PLPs; and
 modulation circuitry configured to generate the broadcast stream for transmission according to the packets generated by the processing circuitry.

12. The transmission apparatus according to claim 11, wherein the PLP information is added to a descriptor included in an IP packet or a UDP (User Datagram Protocol) packet in the corresponding PLP, to an extension header of a first transmission packet in the corresponding PLP for transmitting the IP packet, to an extension header of a second transmission packet in the corresponding PLP for transmitting the first transmission packet, to signaling data included in the first transmission packet, or to a header of the signaling data.

13. A data processing method for a transmission apparatus, the method comprises:
 generating, by processing circuitry of the transmission apparatus, packets to be included in a plurality of PLPs (Physical Layer Pipes) of a broadcast stream that supports an IP (Internet Protocol) transmission method;
 allocating IP addresses and port numbers of IP packets or UDP (User Datagram Protocol) packets included in the plurality of PLPs, such that each combination of an IP address and a port number of an IP packet or a UDP packet included in the plurality of PLPs is unique for each PLY in which the corresponding IP packet or the corresponding UDP packet is included;
 including information regarding the IP addresses and the port numbers in the respective IP packets or the respective UDP packets; and
 generating, modulation circuitry of the transmission apparatus, the broadcast stream for transmission according to the packets generated by the processing circuitry.

* * * * *

UNITED STATES PATENT AND TRADEMARK OFFICE
CERTIFICATE OF CORRECTION

PATENT NO. : 10,715,857 B2
APPLICATION NO. : 15/766886
DATED : July 14, 2020
INVENTOR(S) : Lachlan Michael and Kazuyuki Takahashi It is certified that error appears in the above-identified patent and that said Letters Patent is hereby corrected as shown below:

In the Claims

1. Column 32, Line 29, Claim 2, "IF" should read --IP--
2. Column 33, Line 29, Claim 9, "Which" should read --which--
3. Column 33, Line 32, Claim 9, "identifying" should read --identifying,--
4. Column 34, Line 41, Claim 13, "PLY" should read --PLP--
5. Column 34, Line 46, Claim 13, "generating," should read --generating, by"--

Signed and Sealed this
Twenty-third Day of January, 2024

Katherine Kelly Vidal
*Director of the United States Patent and Trademark Office*